(12) United States Patent
Juenger

(10) Patent No.: US 7,895,311 B1
(45) Date of Patent: Feb. 22, 2011

(54) CONTENT DISTRIBUTION SYSTEMS

(75) Inventor: Arthur William Juenger, Fenton, MO (US)

(73) Assignee: Arthur W. Juenger, Camdenton, MO (US)

( * ) Notice: Subject to any disclaimer, the term of this patent is extended or adjusted under 35 U.S.C. 154(b) by 1132 days.

(21) Appl. No.: 11/560,961

(22) Filed: Nov. 17, 2006

(51) Int. Cl.
 *G06F 15/173* (2006.01)
(52) U.S. Cl. ............... 709/223; 709/227; 709/228
(58) Field of Classification Search ........... 709/223, 709/227, 228
 See application file for complete search history.

(56) References Cited

U.S. PATENT DOCUMENTS

| | | | |
|---|---|---|---|
| 7,089,425 B2 * | 8/2006 | Chan ..................... | 713/189 |
| 7,493,289 B2 * | 2/2009 | Verosub et al. ............. | 705/51 |
| 7,496,540 B2 * | 2/2009 | Irwin et al. ............. | 705/59 |
| 7,536,725 B2 * | 5/2009 | Raciborski ............. | 726/30 |
| 2002/0116474 A1 * | 8/2002 | Copeland et al. ........ | 709/219 |
| 2004/0024688 A1 * | 2/2004 | Bi et al. .............. | 705/37 |
| 2005/0021817 A1 * | 1/2005 | Shimizu et al. ......... | 709/231 |
| 2005/0021995 A1 * | 1/2005 | Lal et al. ............. | 713/200 |
| 2005/0044016 A1 * | 2/2005 | Irwin et al. ........... | 705/30 |
| 2005/0144019 A1 * | 6/2005 | Murakami et al. ........ | 705/1 |
| 2005/0192099 A1 * | 9/2005 | Nguyen et al. .......... | 463/42 |
| 2006/0117172 A1 * | 6/2006 | Zhang et al. ........... | 713/2 |
| 2006/0123117 A1 * | 6/2006 | Heutchy et al. ......... | 709/227 |
| 2006/0135258 A1 * | 6/2006 | Maheshwari et al. ..... | 463/42 |
| 2006/0258427 A1 * | 11/2006 | Rowe et al. ........... | 463/16 |
| 2006/0294020 A1 * | 12/2006 | Pence et al. ........... | 705/59 |
| 2007/0124819 A1 * | 5/2007 | Strohwig et al. ........ | 726/26 |
| 2007/0162335 A1 * | 7/2007 | Mekikian .............. | 705/14 |
| 2007/0174471 A1 * | 7/2007 | Van Rossum ............ | 709/229 |
| 2007/0282893 A1 * | 12/2007 | Smith et al. ........... | 707/102 |
| 2008/0004957 A1 * | 1/2008 | Hildreth et al. ......... | 705/14 |
| 2008/0115167 A1 * | 5/2008 | Hermsmeyer et al. ..... | 725/46 |
| 2008/0242221 A1 * | 10/2008 | Shapiro et al. .......... | 455/3.06 |
| 2008/0242280 A1 * | 10/2008 | Shapiro et al. .......... | 455/414.3 |
| 2009/0150406 A1 * | 6/2009 | Giblin ................. | 707/10 |
| 2009/0227378 A1 * | 9/2009 | Rom et al. ............ | 463/42 |
| 2009/0240568 A1 * | 9/2009 | Ramer et al. ........... | 705/10 |

* cited by examiner

*Primary Examiner*—Krisna Lim
(74) *Attorney, Agent, or Firm*—Joe Fenlon

(57) ABSTRACT

The present invention relates to a means and method for allowing numerous clients with handheld portable computing devices, set top boxes, or any other computer device to actively participate in games and other programs which normally require larger computers in a fixed location having relatively large bandwidth capacity; the invention can be interfaced with a custom client console, more specifically a gaming console, which extends into multimedia application delivery and. in particular, discloses a software codec which:

(1) Controls multimedia content flow to and from a centralized server network, as well as other console peers:
(2) Comprises an integrated peer to peer Server/Client Daemon with Integrated compression and decompression;
3) Uses a cloud store and forward transport encapsulated over the international standard TCP/IP protocol;
(4) Includes a Best Source Seeking Algorithm; and
(5) Provides a Local Cluster Multi-Cast Daemon, Real Time Performance Reporter and Reviewer.

16 Claims, 21 Drawing Sheets

CONTENT DISTRIBUTION SYSTEMS

FIELD OF INVENTION

The present invention relates to the field of multimedia content delivery over Internet Protocol networks, especially for handheld and multi-player gaming and entertainment environments, and more particularly to the optimization of the transport of said content over lower bandwidth mediums such as wireless networking, and in particular, discloses a software codec (1) which controls multi-media content flow to and from a centralized server network, as well as to and from and between other clients.

BACKGROUND OF THE INVENTION

In recent years there have been numerous efforts made to provide "home" entertainment for consumer markets in a portable context for away-from-home enjoyment. This has been evidenced in a number of different styles of products. The first of these products was based upon simple LCD lights and flashing technology that embodied low yield processors from obsolete personal computer technology such as Tiger Handheld Games. Other examples include portable gaming systems such as the Nintendo Game Boy and the Sony Playstation Portable.

Since the introduction of real time interactive games which allowed multiple users on separate computers or gaming consoles (which in and of themselves are computers built specifically for the purpose of playing games), there has been a concern with content delivery and parallel processing of environmental variables in order to make certain that what one user sees on his screen matches the real time rendering of what other players of the same game see on their respective screens, whereby the game play experience is simultaneous and consistent for all participants.

Originally, this was attempted by a fixed set of maps programmed and shipped with the original game. Since those early games were written specifically for each individual computing or gaming environment, the hardware would be substantially identical and there was little or no chance that one system would outperform the other, and no clock synchronizing was necessary.

Although the active principals are still based on those algorithms, many extensions have been added, for instance—allowance of user customizable experiences, such as map creation or alteration, game configuration augmentation, penalties and rewards for specific game play, etc. More importantly, as games are now designed to allow users with non-specific or at least non-identical hardware to run the same or similar software, a shared timing code becomes necessary to prevent a faster system from running ahead in the processing of events, and to limit the speed of game play to the slower unit.

Additionally, the distinguishing lines between desktop computer, gaming console and portable implementations of both platforms is ever blurring. So now, in addition to real time gaming experiences, users desire real time interactive experiences including video and music (i.e. virtual clubs), tele and video conferencing, online collaboration and even instructional materials. Many of these implementations require delivery of content mixed in nature of medium as well as priority. Today, in a multi-player first person combat game, a user is likely to need to download a map of the virtual environment, including physical definitions such as gravity, three dimensional limitations, atmospheric density, weather patterns, landscape dynamics including hardness and elasticity of surface, ambient environmental data such as sounds for bodies of water, overhead birds or aircraft, and lighting and shadows based on natural illumination. A user will also require information about the other players or inhabitants of this virtual battlefield, fixed data such as names, team associations and physical representations, and changing information such as wielded weaponry, special abilities, level of damage, motion vector and current score. The user may also require the ability to talk to other players or listen in on their conversations for arranging team strategies or deciphering proximity. Other variables such as motion of projectiles or damaged or falling options, movement of vehicles with or without players, etc—each of these mentioned variables and numerous other items too numerous to mention have various levels of priority and bandwidth requirement.

Maps (including ambient data) tend to be large data items, but, because they can be downloaded for persistent storage or downloaded during game play, they are low priority issues and can be downloaded non-linearly if desired. Movement data, however, is miniscule in comparison and tends to be bursty in nature. Movement information tends to be critical as holds can cause hiccups in the game play, or down right stalls. Movement data must therefore be sent linearly and continually. Voice data, though much larger than movement data, is also relatively small and bursty and should also be sent linearly to insure proper continuity with game play.

The problem with current implementation is that most of this data is distributed from a single server to each active game participant and requires a high amount of available bandwidth with minimal network errors to be reliable. The two most common strategies are to supply either an off-premise server or to assign one of the active participants as the game daemon. There are advantages and disadvantages to both implementations. The Off-Premise Server forces all the clients to communicate so that game play is reasonably consistent with little opportunity for interruption or adulteration of experience by hackers or others who might partake of unethical game play strategies. The problem with Off-Premises Server is that the further the individual game player's node is from the host server, the worse game play is going to be for everyone. Using a Designated Game Daemon allows for better performance within a localized segment or even region, but allows users to interfere with the gaming or multi-media experience—perhaps even corrupt the signal with malicious code or content.

Having recognized these needs and pitfalls, it became evident that a codec for content delivery, both real time and staggered, needed to be developed. The software codec described herein satisfies that need by taking the benefits of the Off-Premises Server and Designated Game Daemon while minimizing their negative effects, and simultaneously protecting the ownership rights of the game proprietor and limiting participants to authorized players.

SUMMARY OF THE INVENTION

It is an object of the present invention to provide a software codec which improves data transport mechanisms and systems for portable online game play and multi-media experiences.

In accordance with the present invention there is disclosed a software codec comprising (1) an integrated peer to peer Server/Client Deamon with Integrated compression and decompression using Cloud Store and Forward Transport encapsulated over the international standard TCP/IP protocol to allow content to be sent, received and forwarded non-sequentially but in a completely re-integratable, lossless format with error checking; (2) a Best Source Seeking Algorithm insuring that close available authorized hosts with the best available bandwidth including circuit wide conservation are always used as sources; (3) a Local Cluster Multi-Cast Daemon to allow all authorized clients within a specific cluster to receive data from local nodes so that many may connect to the same dataset without congesting remote internet pathways; and (4) Real Time Performance tracking and logging from local clients to central systems so that other clients may learn from other networked clients to save themselves from repeating downed, damaged or tainted pathways.

DETAILED DESCRIPTION OF THE PREFERRED EMBODIMENT

Figure 1:
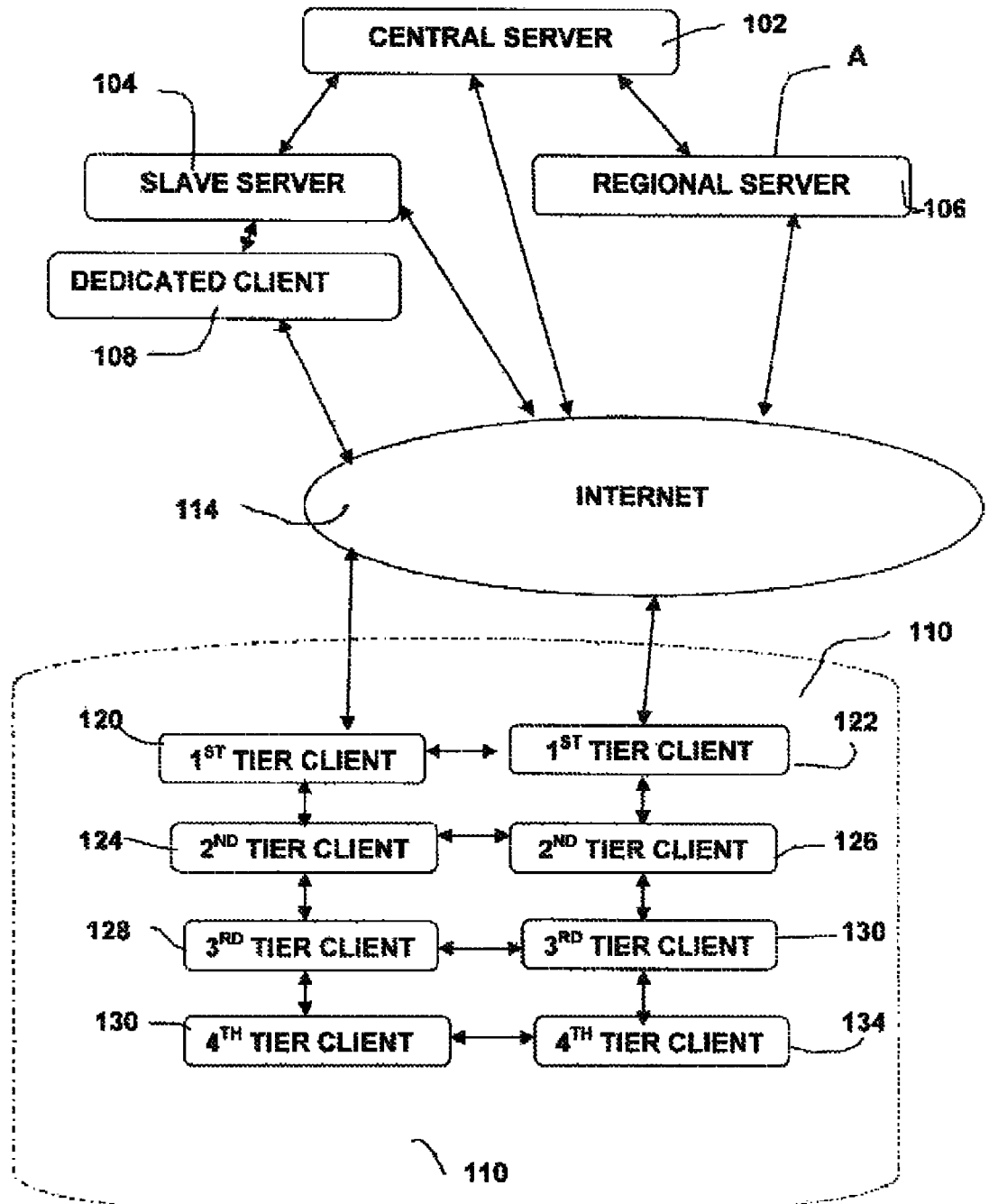
FIG. 1 is a block diagram of a system which embodies my invention showing the relationship of the servers to the clients, to the Internet, and the members and participants of the system to each other.

Referring now to FIG. 1 which depicts a distributed data system A in which my invention is embodied, data system A generally includes a Central Server 102, a slave server 104, one or more regional servers 106, one or more dedicated clients 108, and one or more local clusters 110 of clients. The servers and clients communicate with each other over a public communications network 114, such as the Internet. Other types of communications networks may also be used, in addition to or in place of the Internet, including local area networks (LANS) and wide area networks (WANS) without departing from the nature and principal of my invention. Communications network 114 may also be implemented in wired and/or wireless communications media.

Dissemination of information through the system A to outlying clients originates from Central Server 102 and downstreams into one or more slave servers 104 which then downstreams into one or more regional servers 106 which then downstreams into a myriad of smaller clients, generally comprised of an ever changing mix of peer to peer (P2P) clients, some with dedicated broadband, some with intermittent broadband, and some with intermittent lowband. Connections from Central Server 102 to slave server 104 and then to regional hubs 106 are primarily unidirectional; however, there will always be bidirectional traffic as client status and content upload information must make its way back to the Central Server 102 as will be shown in the following parts of this specification. Varying combinations of P2P clients will be located in compartmentalized groupings referred to as local clusters 110.

These local clusters 110 are typically defined as any group of clients sharing a common local gateway beyond their ISP, and will usually but not always consist primarily of wireless devices. Because of the variance in the type of clients within a given cluster 110, it is important to be able to identify the strongest clients within each cluster 110 with regard to the external connection to the network 114 and to other strong clients within the cluster 110. Since the different clients within a local cluster 110 will have varying bandwidths and capabilities, the codec used, as will be later seen, will treat the clients as being located in different tiers according to their respective bandwidths and strengths.

Referring again to FIG. 1, clients 120 and 122 have been arbitrarily classified by the codec as first tier clients because their bandwidths and strengths are greater than other clients within the cluster 110 and more likely to be able to supplement any weaknesses of other clients within the cluster 110. Similarly, clients 124 and 126 have been classified by the codec as more likely to be able to supplement any needs of the remaining clients within the cluster, clients 128 and 130 as the next most likely, and clients 132 and 134 as the least most likely. It should be here noted that the least most likely will often be wireless and other handheld devices.

Within the system A there are various communication pathways available for data transmission between the various devices in the system. The speed with which the data is transferred will depend upon the bandwidth and strength of the clients used to conduct the transfer. The wider the bandwidth, the less likely it is that a large amount of data being transferred will cause a slowdown. The connections between the Central Server 102 and the Slave Server 104 should be the broadest, and the connections between the higher tiered clients should be the narrowest. It is recognized by those proficient in the art that the backbone of any providing network depends upon the speed in which data is moved.

Figure 2:
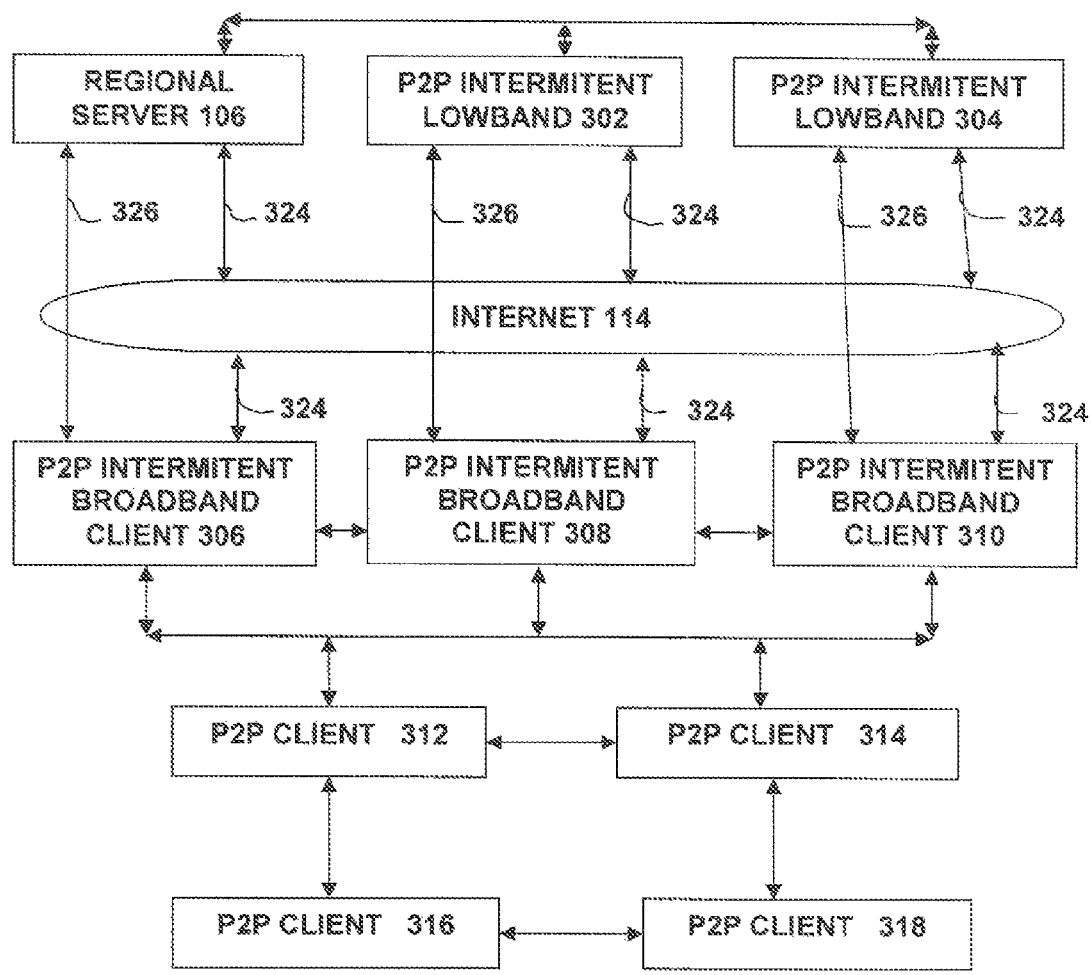
FIG. 2 is a block diagram of one preferred system in which servers having different capabilities provide content through the Internet to clients having different capabilities.

The clients in the local clusters 110 interoperate in a slightly different manner than normal web implementation. In a typical web implementation, a client is likely to have feeds from various distances, as long as the connection performance is high and reliable. In my invention, within local cluster 110, the clients feed each other even though they all share a common gateway, except for a select few who act as the external bridges to the network A. The strongest (or a subset thereof) clients will receive streams from outside cluster 110 and retransmit the streamed input to the next strongest clients within the cluster (or in the case of a small cluster, all the remaining clients) until all requesting clients within cluster 110 have received their requested payloads, FIG. 2 demonstrates how the regional server 106, and two P2P intermittent lowband clients 302, 304, would feed data to three P2P intermittent broadband clients 306, 308, 310 serving as second tier clients (STC) through low speed connections 320 and high speed connections 322. Each of the STC clients 306, 308, 310, exchange data with each other while also propagating the data to the third tier clients 312, 314 which in turn propagate the data to the fourth tier clients 316, 318. Ideally, the full content load should be sent only one time. This means that ideally, between the three providing points of contact, no single byte range should be repeated for any specific content unless due to a failed chunk. Only chunks of content identified as having been successfully transmitted would be forwarded to the next tier of clients. This feature would reduce the load carried by the common gateway and therefore decrease the time it would take all the clients to receive full content, in that there would be no competition for the limited bandwidth in relation to the content that all requesting clients would ultimately share in common.

To insure that this is carried out in the most efficient manner, one of the strongest clients within the cluster must be selected to serve as conductor. The mechanism for this selection is arbitrary and should be chosen by a vote of sorts from the strongest of the cluster clients behind the shared gateway. This conductor will read the offered byte mask of the content and specify which second tier clients (including itself) receive particular chunks or slivers (a sliver being a sub component of a chunk, or a byte range within a byte range).

Figure 3:
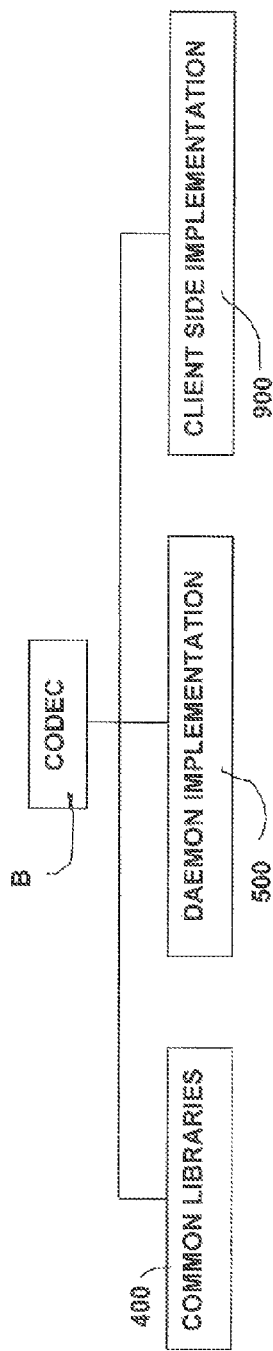
FIG. 3 is a block diagram of my codec and its three major parts.

Operation of the system is controlled by a codec B which is divided into three main parts a Common Libraries Section 400, a Daemon Implementation Section 500, and a Client Side Implementations Section 600 as shown in FIG. 3.

Figure 4:
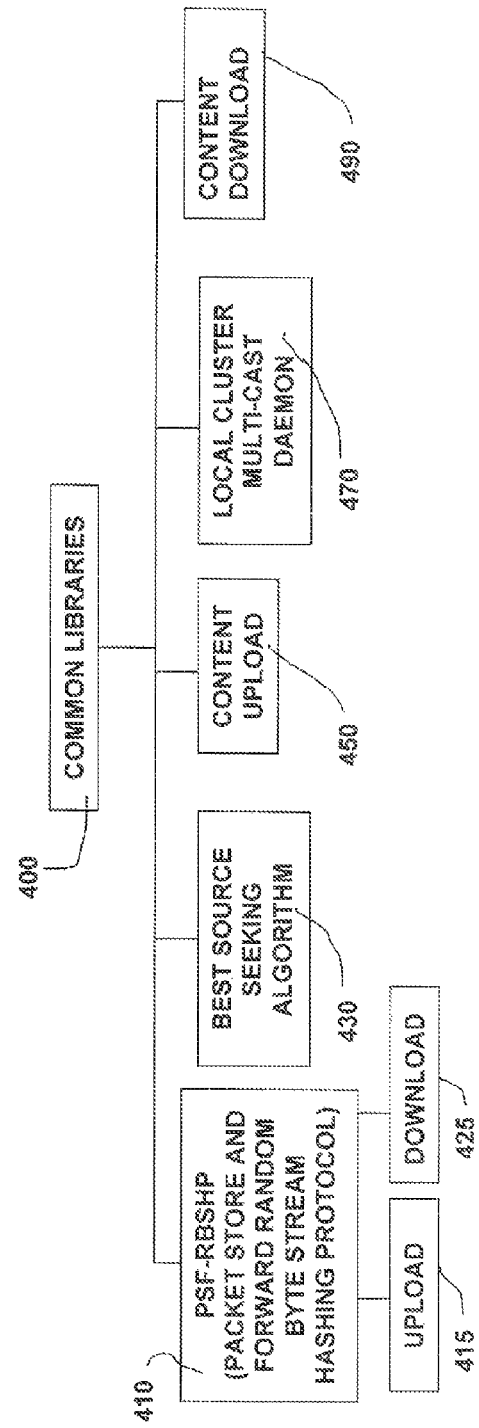
FIG. 4 is a block diagram of the Common Libraries of my codec.

As seen in FIG. 4, the Common Libraries Section 400 of the codec B is divided into five parts—(1) the Packet Store and Forward Random Byte Stream Hashing Protocol Section 410 (PSF-RBSHP), (2) the Best Source Seeking Algorithm Section 430, (3) the Content Upload Section 450, (4) the Local Cluster Multi-/Cast Daemon Section 470, and (5) the Content Download Section 490. It should be further noted that the PSF-RBSHP Section 410 is subdivided into two subsections—Subsection 415 for uploading content and Subsection 425 for downloading content.

Figure 5:
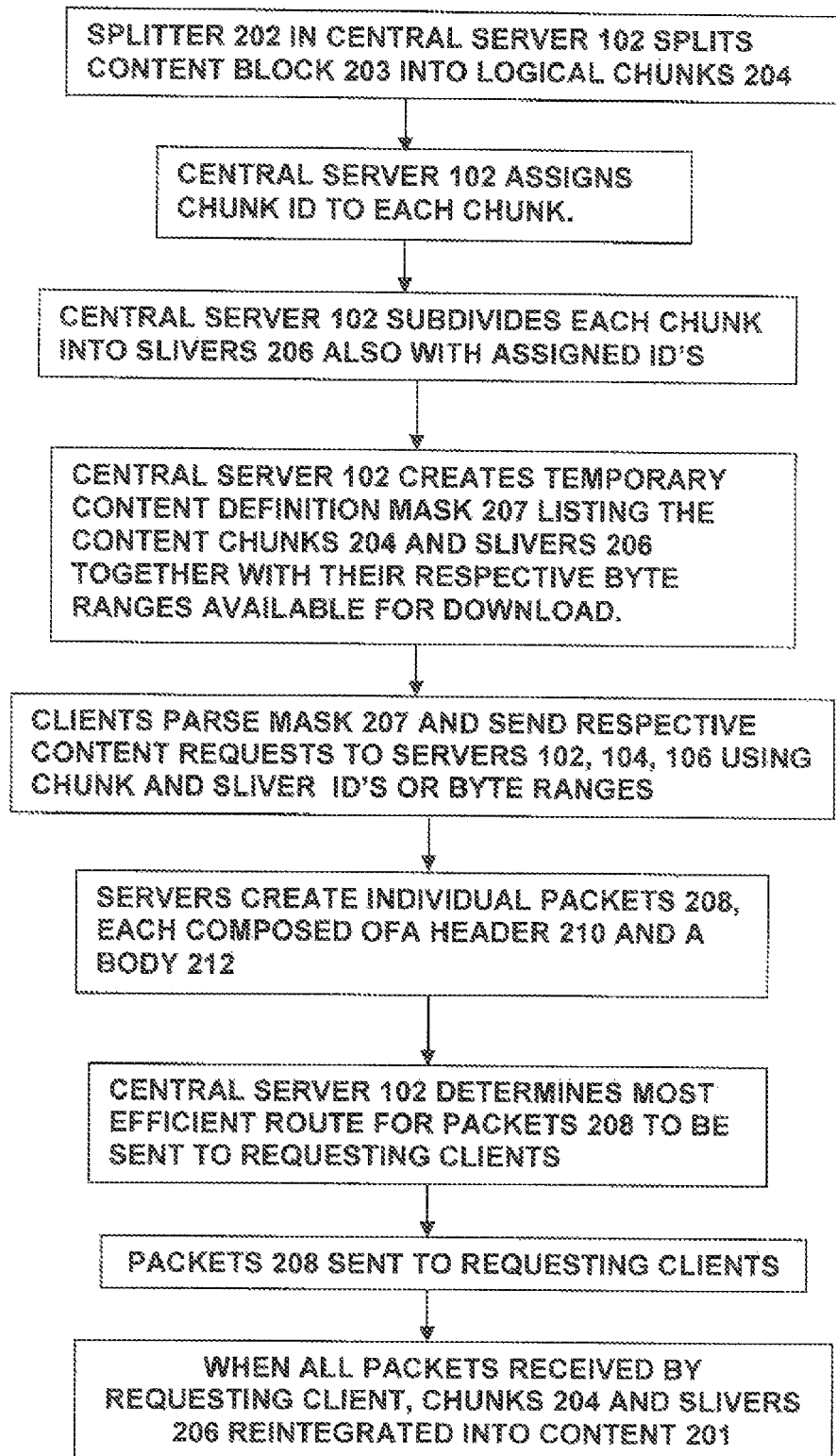
FIG. 5 is a flowchart showing how content is broken down for distribution and then restored to original condition when delivered.

In content distribution, FIG. 5 presents a flow chart of the dividing of content 201 into chunks and slivers, and the distribution of the chunks and slivers to a Send Branch. Because the type of content 201 transmitted is not crucial to the operation of my invention, each content provider may and usually will recommend a method of distribution as a matrix definition, but for the sake of brevity here, the content 201 will be presented as a single binary file.

The content 201 is passed through a splitter 202 at the server end (whether the server is a dedicated server, or a peer to peer client is irrelevant) where the content is divided in to logical segments yielding a content matrix block 203 of chunks 204. Each chunk 204 in this ordered matrix is given a block ID by the Central Server 102 and subdivided into content slivers 206. Content slivers 206 are similarly prefixed with a sliver ID as well as the ID of the chunk 204 to which they belong. When all chunks 204 and slivers 206 have been marked with identification, the content 201 is available for downloading to the clients. Clients are then provided with a content definition mask 207 which is an XML representation of the content chunks 204 and slivers 206 with their respective byte ranges 208 available for download. Clients parse this definition and then send their respective requests for content 201 using either a matrix of chunk IDs (and optionally sliver IDs), or a matrix of byte ranges based solely upon the needs of the clients.

The servers 102, 104, 106 respond by creating individual packets 208 of the requested information, and analyzing the threshold and connect efficiency of each client to determine the most efficient route for the transmission of each packet 208 to each respective client. Each packet 208 transferred between nodes contains a header 210 and a body 212, like a miniature XML page, but due to the methodology of transfer, it is represented as a ballistic payload. The Header 210 contains information defining the whole and parts of the packet, information to track and route the packet 208 as well as information necessary to reintegrate the packet into its intended (or original) form. Each packet 208 includes a description of the specific data being sent, either a chunk ID or sliver ID, or a byte range, the total size of the packet, and the checksum for the specific packet. After receipt of a packet 208, the client will then transmit a request for the next packet 208 desired and report the status of the last packet 208 received. While this is seemingly redundant, it is necessary for servers 102, 104, 106 to track failed packets 208 between themselves and the clients. Failed packets 208 are re-re-quested, and retransmitted until received properly.

The data is stored in a transient state as an array of objects (reflecting the transmission model the client selected, be it chunk or byte range oriented). The data is therefore arranged in a FIFO (First in First Out) stack 214. With every successful acquisition of a complete block 203 (byte range or chunk), the content definition mask 207 for the local client is updated so that clients may be aware of what has been received and what remains to be received.

Once the packets 208 necessary to duplicate the original data have been received by a client, the client will pass the data through a reintegrater 214 to reproduce a complete and exact duplicate of the original content 201 within the client.

Figure 6:
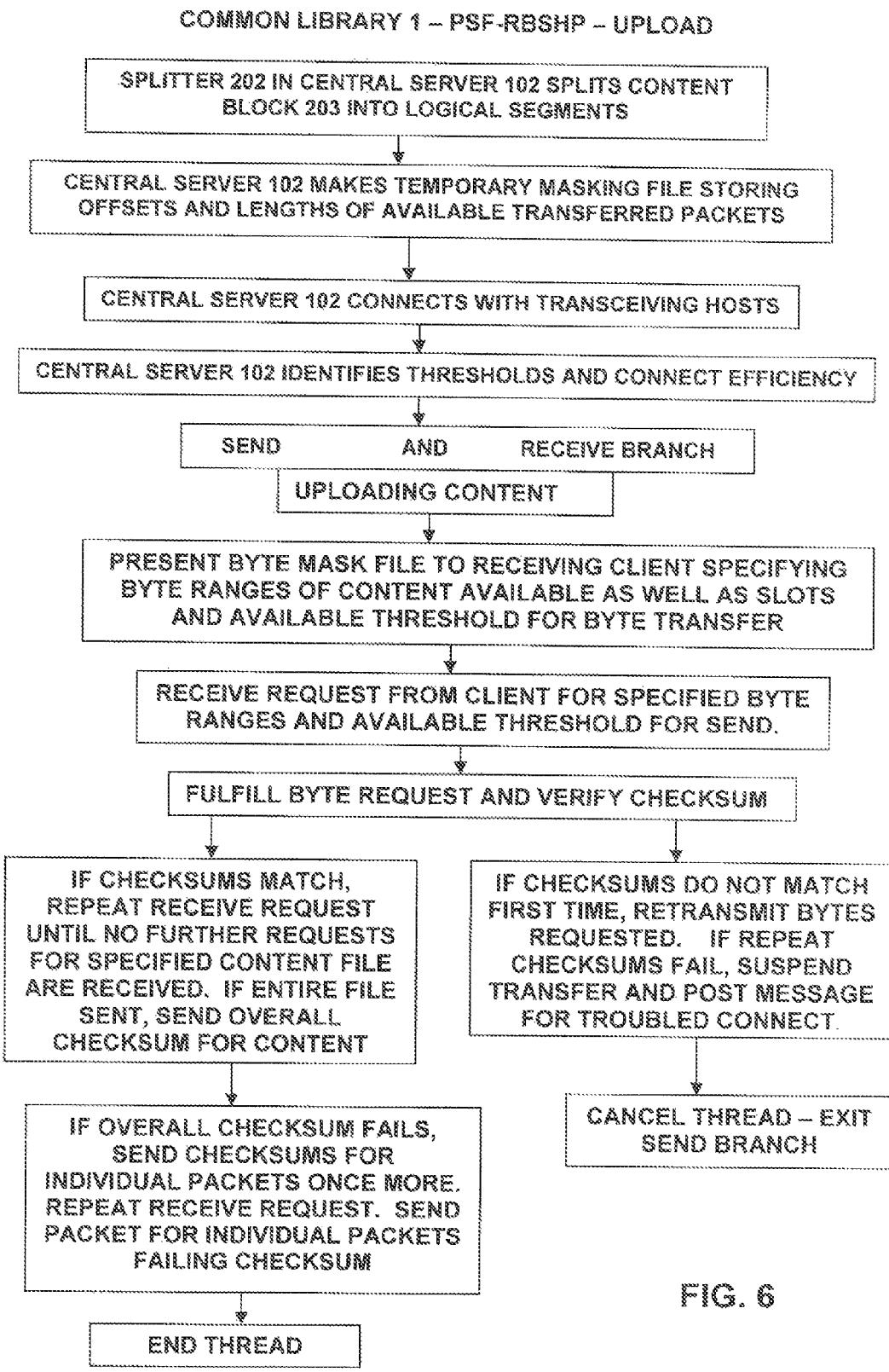
FIG. 6 is a flowchart of the PSF-RBSHP Common Library for uploading content.

FIG. 6 presents a flow chart of the operation of the PSF-RBSHP 410 Common Library and its Subsection 415 with respect to uploading transceivers. Once the content 201 is divided and compressed into packets 208 as shown in FIG. 5, the Mask File 207 is presented to authorized servers and sending clients to parse and make content requests. Each server and client submits specific requests for data including byte ranges and available threshold. The uploaders fulfill the byte requests and verify the checksums as packets are transmitted. As each checksum matches, additional individual content packets 208 are sent until each request is completely filled. If a packet fails the checksum, that packet is resent until filled or a troubled connect is shown to exist. As the request is filled, an overall checksum is sent for verifying receipt of the entire content file. In the transmission scheme utilized, errors in transmission can usually be corrected by repeat sending of a few packets instead of the entire content file.

Figure 7:
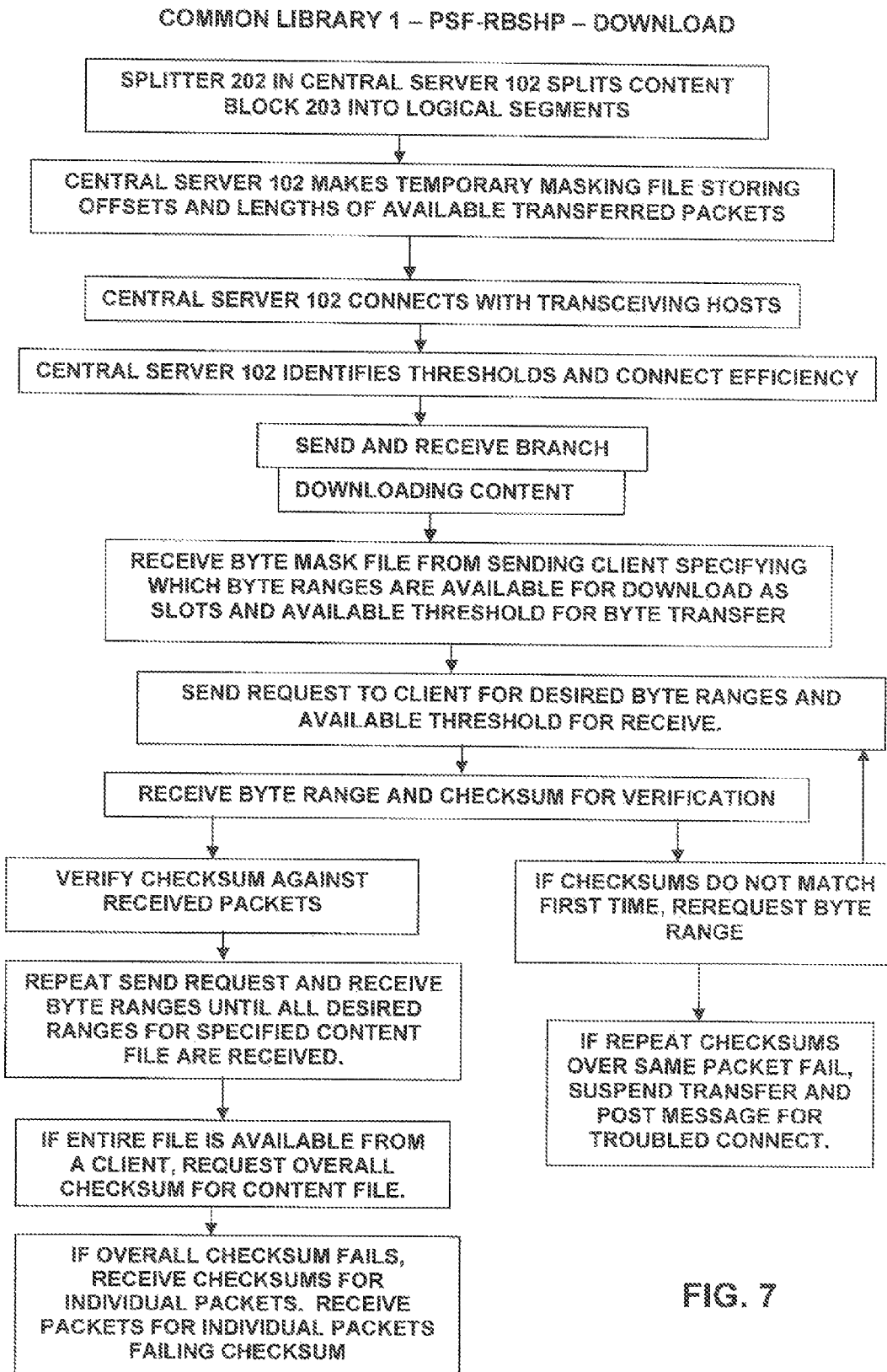
FIG. 7 is a flowchart of the PSF-RBSHP Common Library for downloading content.

FIG. 7 presents a flow chart of the operation of the PSF-RBSHP 410 Common Library and its Subsection 425 with respect to downloading transceivers. Once the content 201 is divided and compressed into packets 208 as shown in FIG. 5, the Mask File 207 is presented to authorized receiving clients to parse and make content requests. Each client submits specific requests for data including byte ranges and available threshold. The byte requests are filled on a packet by packet basis and checksums are verified as packets are transmitted. As each checksum matches, additional individual packets 208 are sent until each content request is completely filled. If a packet fails the checksum, that packet is resent until filled or a troubled connect is shown to exist. As the order is completed, an overall checksum is sent for verifying receipt of the entire content file. In the transmission scheme utilized, errors in transmission can usually be corrected by repeat sending of a few packets instead of the entire content file.

Figure 8:
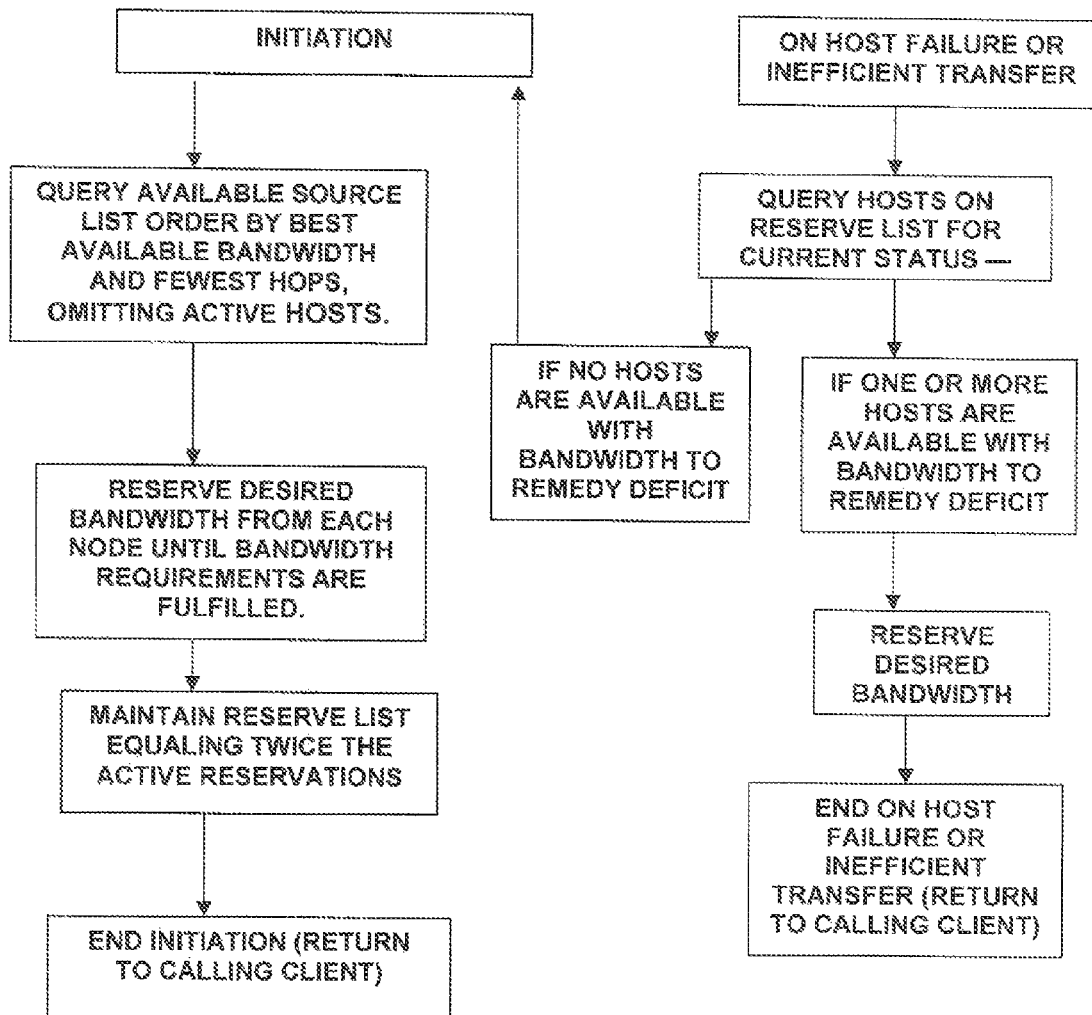
FIG. 8 is a flow chart of the Best Source Seeking Algorithm Common Library.

FIG. 8 presents a flow chart of the operation of the Second Common Library, the Best Source Seeking Algorithm 430, which functions to find the best route for supplying content to clients within the network A. Initiation of the operation of the algorithm is caused by a client inquiry requesting content 201 and inquiring as to the available sources listed by best available bandwidth and the fewest hops. The algorithm 430 reserves the desired bandwidth from each node until the client's bandwidth requirements are filled. It also maintains a reserve list equaling twice the active reservations. When routes and reservations have been completed, it terminates its effort until later queried. If a host transfer fails or there is an inefficient transfer, it queries the hosts on reserve list for current status and reserves the desired bandwidth from hosts available to remedy the deficit. If the deficit is remedied, the initiation procedure is stopped. If the deficit is not remedied, or the host fails again, initiation is halted and the client is notified.

Figure 9:
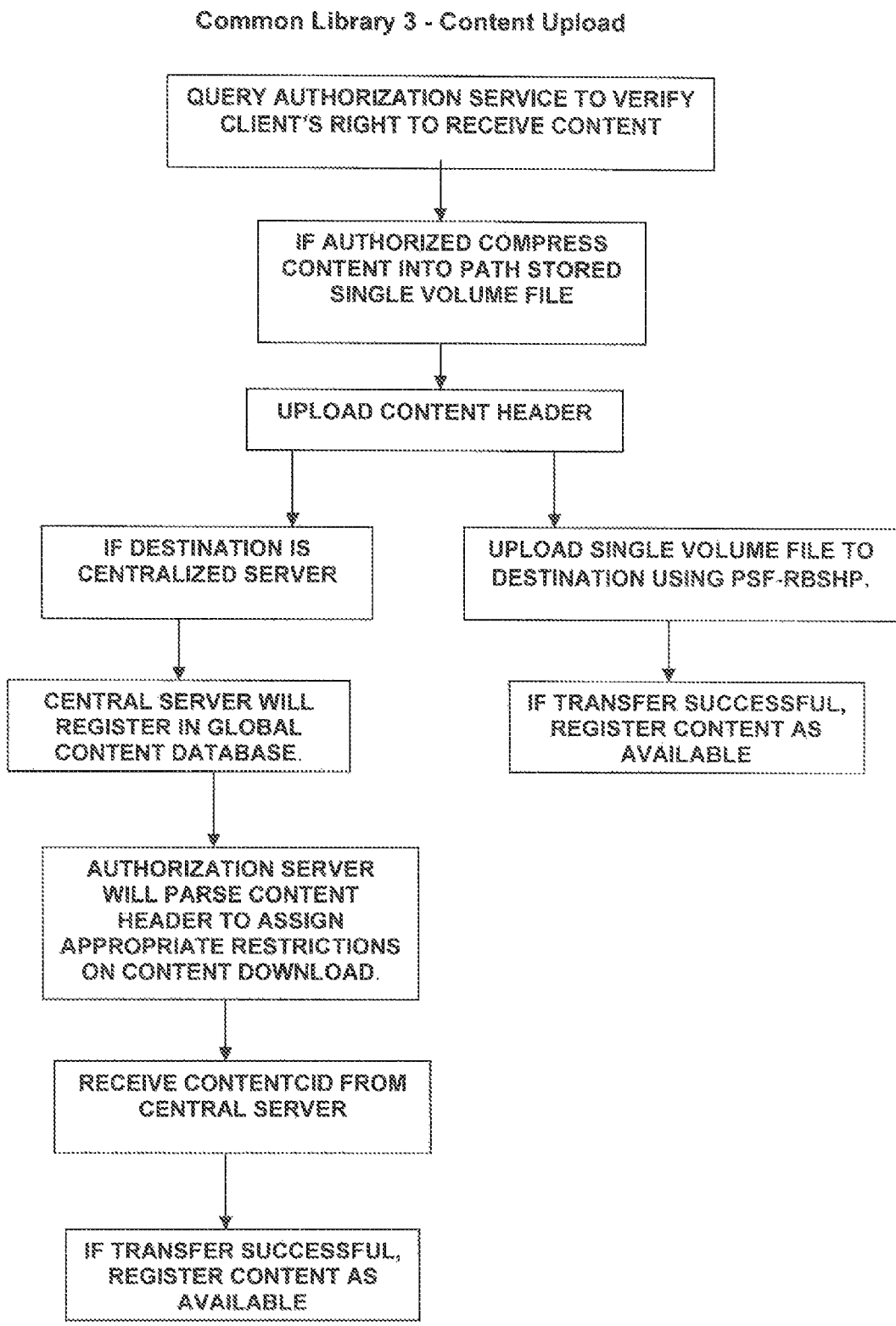
FIG. 9 is a flow chart of the Content Upload Common Library.

FIG. 9 depicts the processes of the Content Upload Common Library 450. When a client makes a request to receive content, the Library 450 queries the Authorization Service to verify that client's right to receive content. If that client is so authorized, the content is compressed into a path stored single volume file and the content header is uploaded.

If the content destination is a centralized server, the Central Server will register in the Global Content Data Base, the Authorization Server will parse the content header to assign appropriate restrictions on content download, and the centralized server will receive the ContentCID from the Central Server. After receipt of the ContentCID, the content is registered as available.

If the content destination is not a centralized server, the Central Server will upload a single volume file to the destination using the PSF-RBSHP Common Library. After receipt of the single volume file, that content is registered as available.

Figure 10:
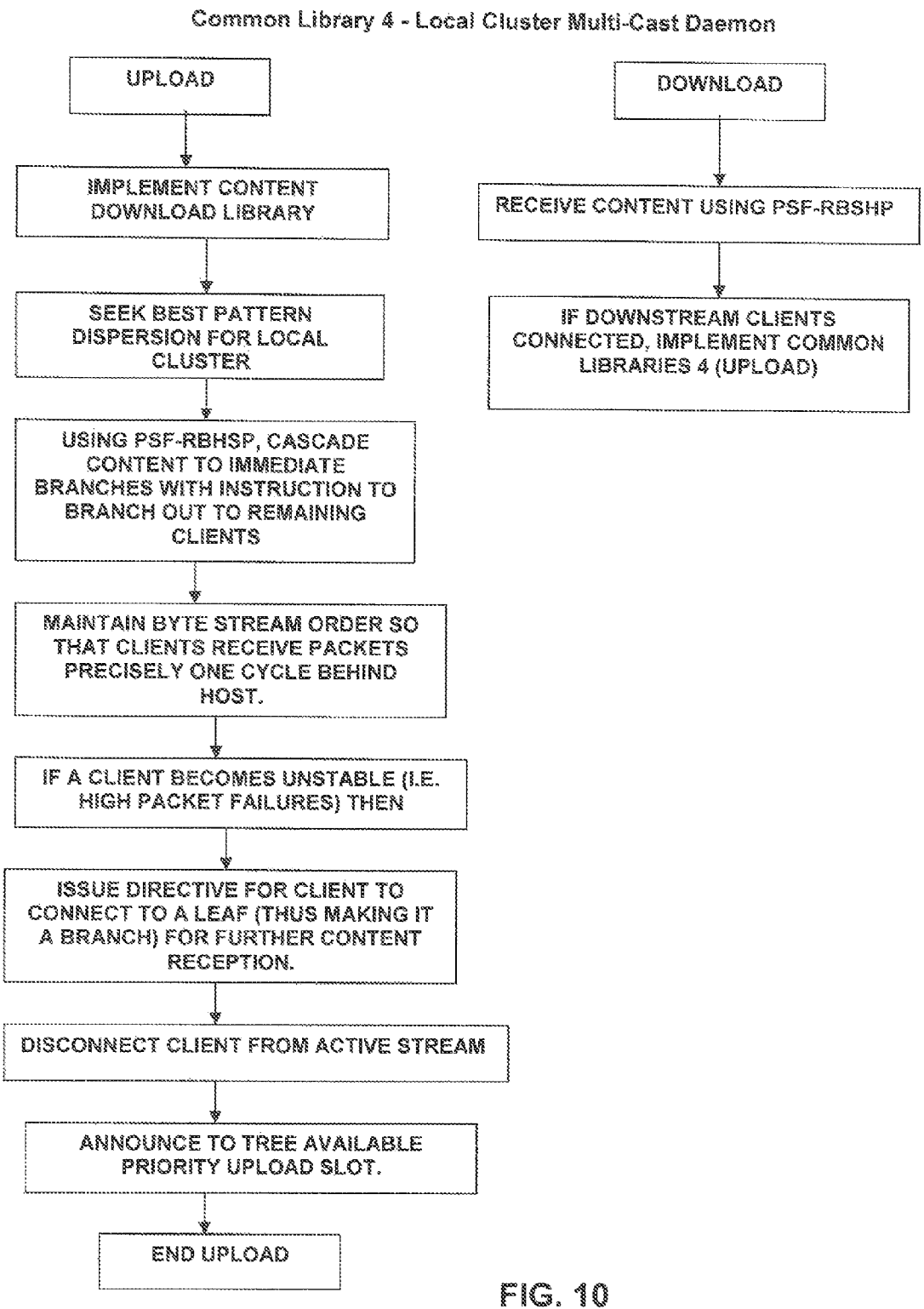
FIG. 10 is a flow chart of the Local Cluster Multi-Cast Daemon Common Library.

FIG. 10 depicts a flow chart of the processes of the Local Cluster Multi-Cast Daemon Common Library 470. When content is to be uploaded, Common Library 470 implements Common Library 430, the Best Source Seeking Algorithm and seeks out the best pattern dispersion for a given local cluster. Then using PSF-RBSHP, it cascades the content to immediate branches in the cluster with instructions to branch out to remaining clients within the cluster. The Library 470 maintains byte stream order so that clients receive packets precisely one cycle behind host. If a client receives a high number of packet failures, it issues a directive for that client to connect to a leaf for further content reception and disconnects that client from the active stream. When that client is disconnected it announces to the tree that there is an available priority upload spot on the tree, and ends the upload.

In downloading within the local cluster, Library 470 receives the content using PSF-RBSHP and implements Common Library 450 for connected downstream clients.

Figure 11:
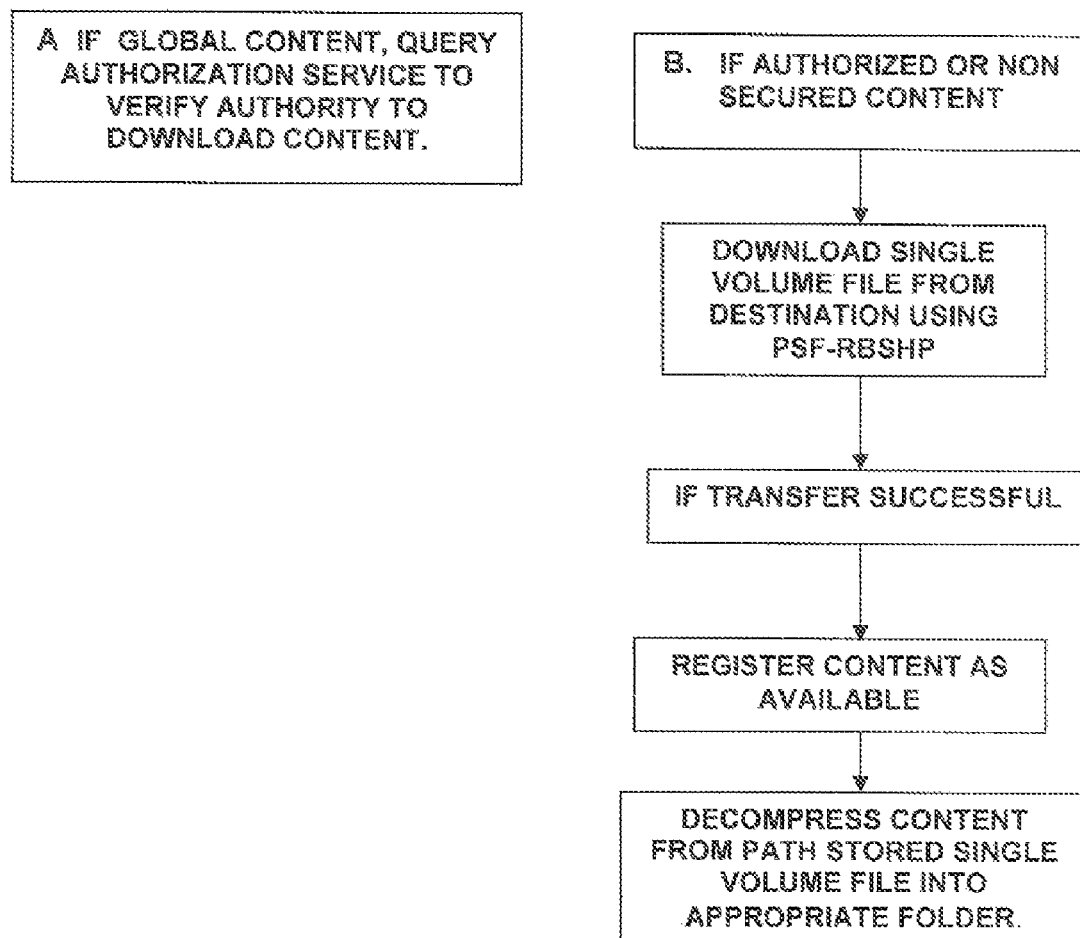
FIG. 11 is a flow chart of the Content Download Common Library.

FIG. 11 depicts a flow chart of the processes of the Content Download Common Library 490. The Library 490 operates in two phases. In the first phase it determines whether the content is global content and authorization is required prior to downloading. If authority is required, the Library 490 queries the Authorization Service to verify the existence of such authority. Once authorization is received, or if authorization is not required, the Library 490 downloads a single volume file from the destination using PSF-RBSHP. If the transfer is successfully completed, the Library 490 registers the content as available, and decompresses the content from its path stored single volume file into the appropriate folder.

Figure 12:
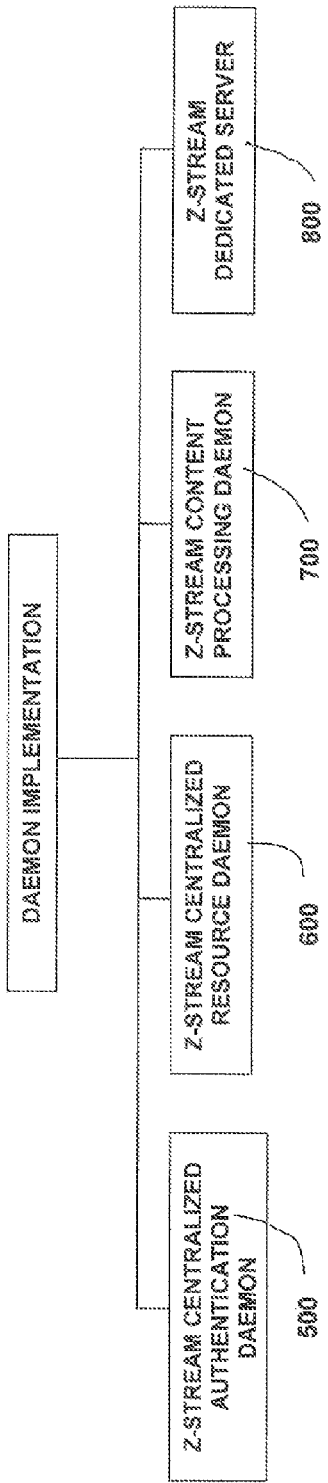
FIG. 12 is a block diagram of the Daemon Implementation branch of my codec.

FIG. 12 is a block diagram of the daemon implementation showing the four daemons, the Z-stream Centralized Authentication Daemon 500, Z-stream Centralized Resource Daemon 600, the Z-stream Content Processing Daemon 700, and the Z-steam Dedicated Server Daemon 800, each of which will be described separately hereafter.

Figure 13:
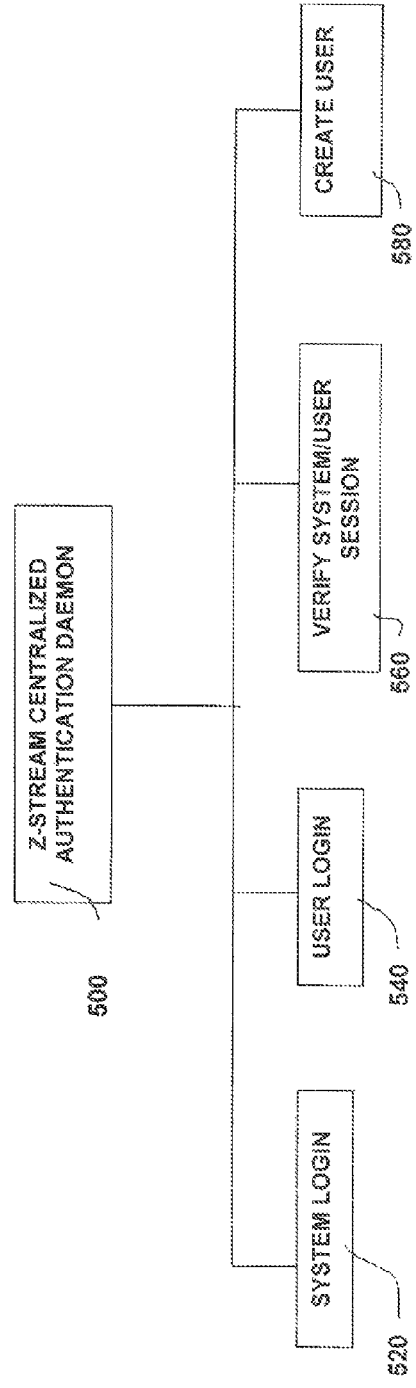
FIG. 13 is a block diagram of the Z-stream Centralized Authentication Daemon.

FIG. 13 depicts the Z-Stream Authentication Daemon 500 ands its four subsections which are the System Login Subsection 520, the User Login Subsection 540, the Verify System/User Session Subsection 560, and the Create User Section Subsection 580.

Figure 14:
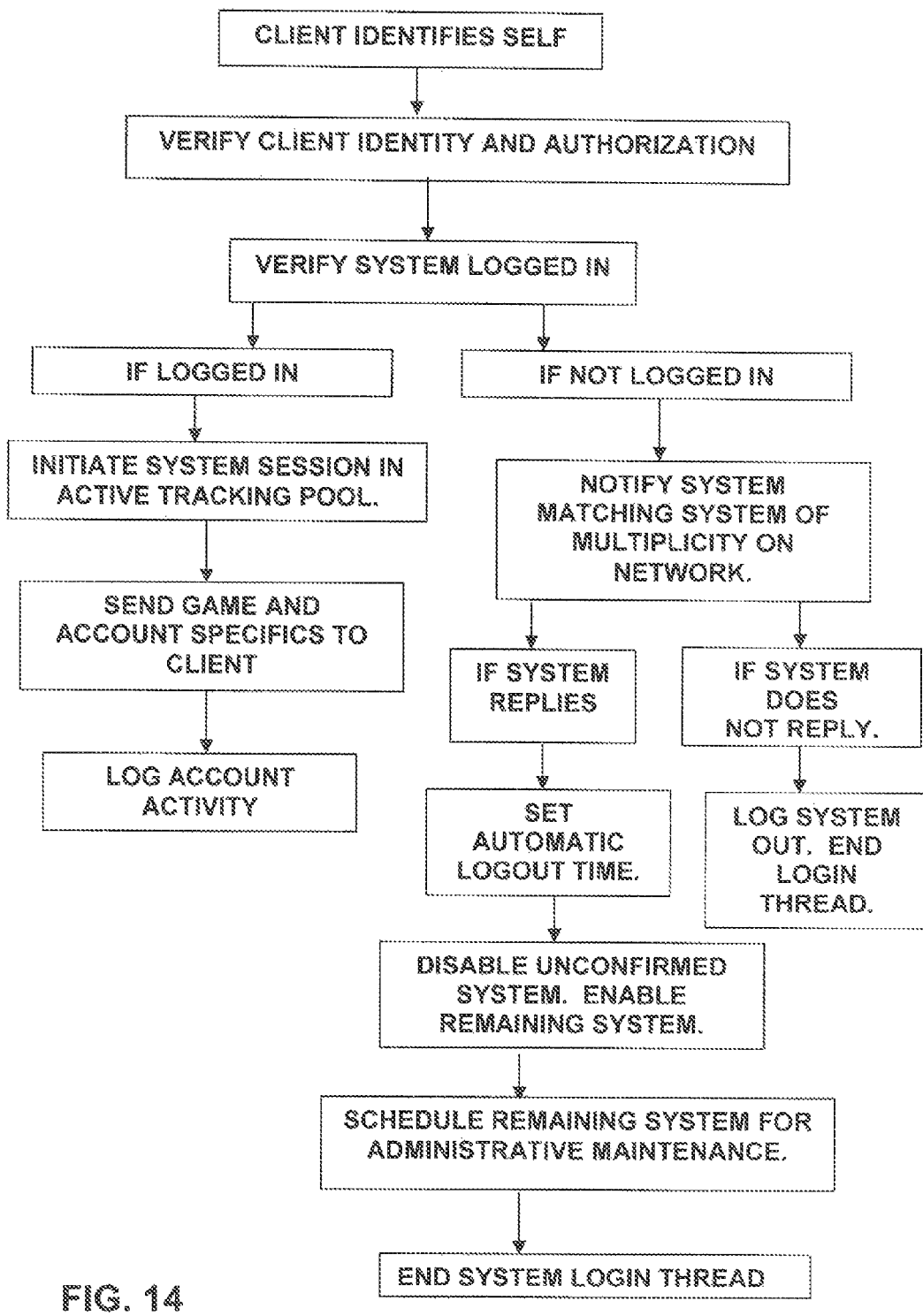
FIG. 14 is a flow chart showing the operation of the System Login Subsection of the Z-stream Centralized Authentication Daemon.

FIG. 14 presents a flow chart of the operation of the System Login Subsection 520 of the Z-Stream Authentication Daemon 500. That subsection goes into operation when a client seeks to login to the network. The client is required to identify itself by communicating its IP Address, Source ID, the password and the last system key successfully installed. The System Login Subsection 520 then polls the database to verify (1) that the Source ID matches an existing system, (2) that the password matches an existing account, and (3) that the account is active and authorized to interact with the Z-stream network. If the verification is in the affirmative, the System Login Subsection 520 then (1) checks the active registry to insure that the system is logged in uniquely after which it (2) initiates the system session in the active tracking pool, (3) assigns a unique active ID as the System Session ID, and (4) retrieves account specifics including system access levels, ping time until disconnect, a list of associated systems currently attached to the network, and a list of critical updates since the last update key. That retrieved information is sent back to the client with the active System Session ID and the time out. The System Login Subsection 520 then concludes the System Login by logging the account activity and the perceived speed to and from the client.

If the System Login Subsection 520 is unable to verify that the Source ID matches an existing system, that the password matches an existing account, and that the account is active and authorized to interact with the Z-stream network, it notifies the non-unique systems matching the system ID that there is a multiplicity on the network, and awaits response from preceding systems in case a disconnection has occurred. If the preceding systems do not reply, the System Login Subsection 520 logs them out from the network and terminates the system login thread.

If the preceding systems do reply, the System Login Subsection 520 sets an automatic timeout at the time allotted in the system owner's subscription, disables disseminating uploads from the non-unique system cluster until registrations are confirmed by the registered system owner, enables confirmed registered system with registered upload abilities, schedules the remaining systems for administrative maintenance, and ends the login thread.

Figure 15:
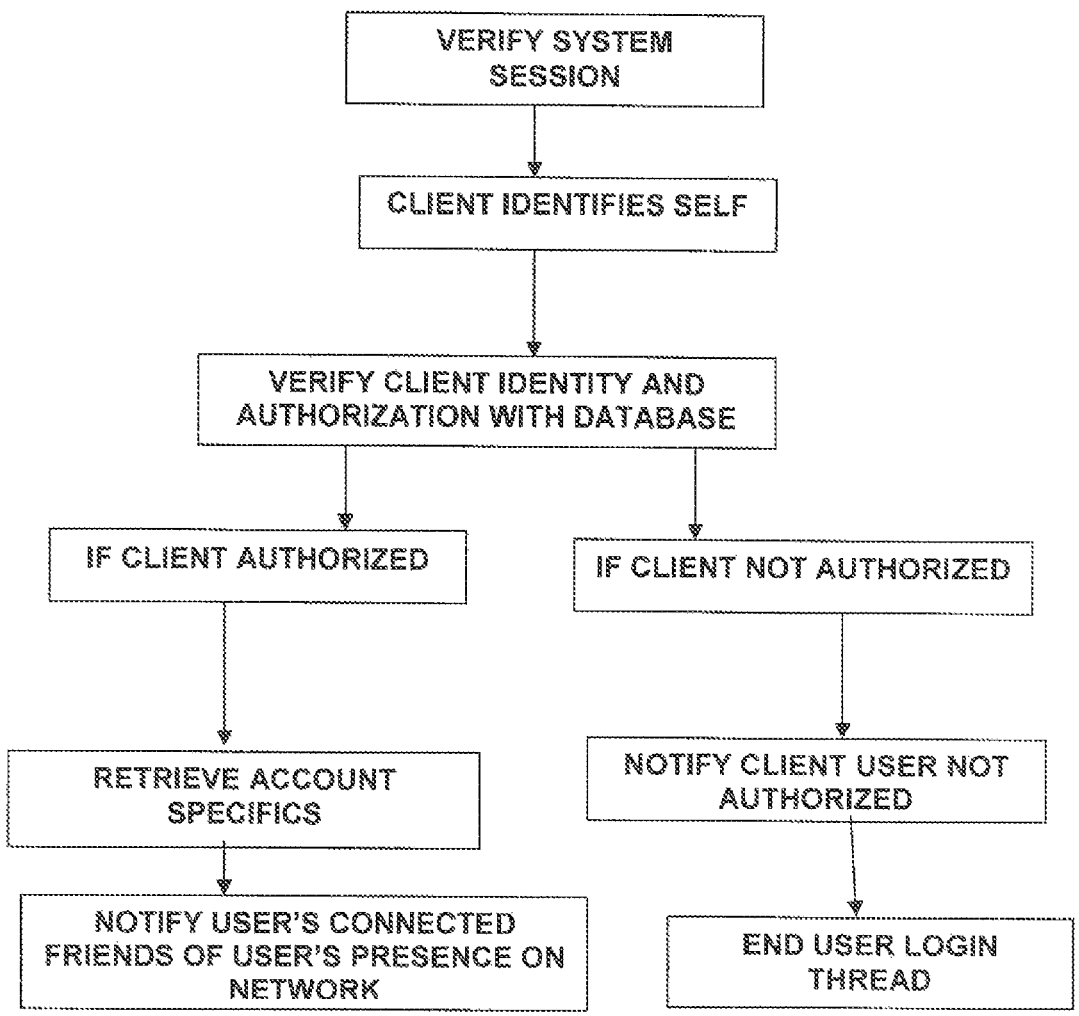
FIG. 15 is a flow chart showing the operation of the User Login Subsection of the Z-stream Centralized Authentication Daemon.

Referring now to FIG. 15, the User Login Subsection 540 of the Z-Stream Centralized Authentication Daemon 500 begins operating after the System Login Subsection 520 verifies the System Session. After the client has communicated the IP Address, the Source ID, the password and the Login ID, the User Login Subsection 540 then polls the database to verify that the Login ID matches an existing user, and that the password matches that user's existing account. If matches are obtained, User Login Subsection 540 retrieves the account specifics including access levels to the network, pending message ID's, last login details and a list of connected friends. Simultaneously, User Login Subsection 540 notifies the actively connected friends of user's presence on the network. If matches are not obtained, User Login Subsection 540 notifies the client that the user is unauthorized to access the network and terminates the User Login thread.

Figure 16:
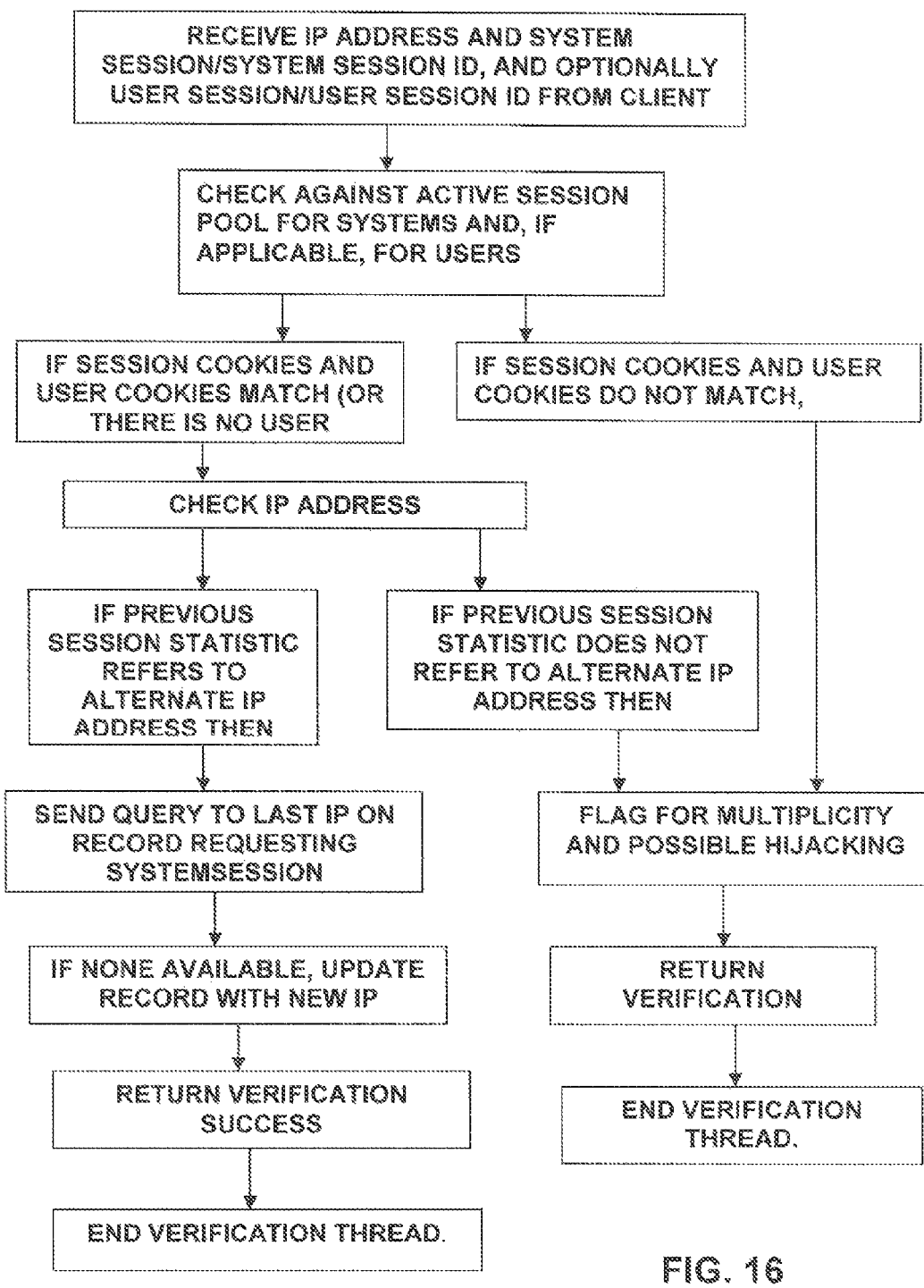
FIG. 16 is a flow chart showing the operation of the Verify System/User Session Subsection of the Z-stream Centralized Authentication Daemon.

FIG. 16 demonstrates how the Verify System/User Session Subsection 560 of the Z-Stream Centralized Authentication Daemon 500 operates. Once the IP address and the System Session and System Session ID (and optionally the User Session/User Session ID from the client) are received, Subsection 560 runs a check against the active session pool for systems and users. If the session cookies and user cookies match (or there is no user cookie), the IP Address is checked. If a previous session statistic refers to an alternate IP Address, then a query is sent to the last IP Address on record requesting system session verification. If none are available, it up-dates the record with the new IP Address, reports verification success and ends the verification thread. If a previous session statistic does not refer to an alternate IP Address, then Subsection 560 flags for multiplicity and possible hijacking, reports verification failure and terminates the verification thread. If the session cookies and user cookies referred to above do not match, Subsection 560 reports verification failure and terminates the verification thread.

Figure 17:
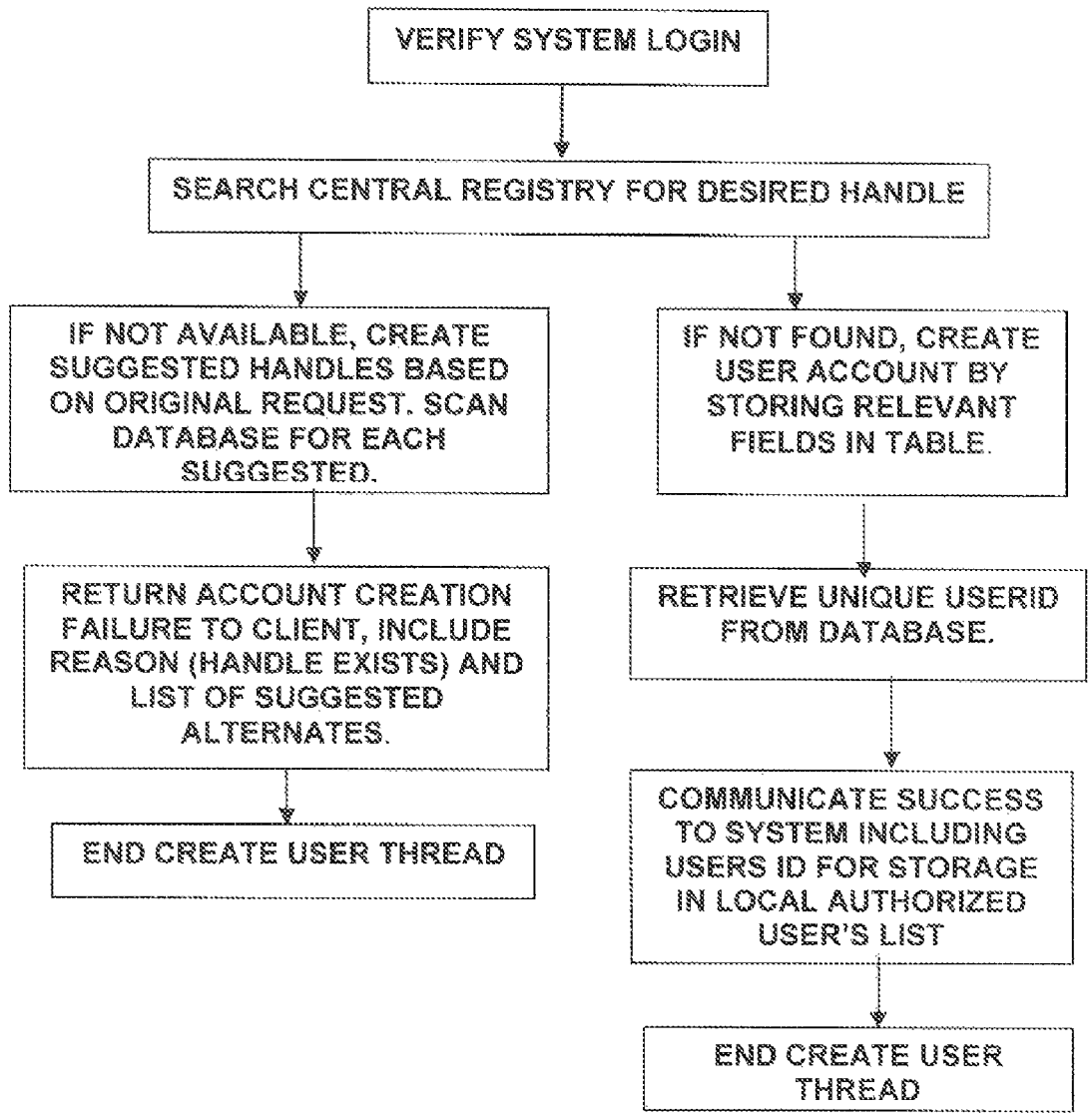
FIG. 17 is a flow chart showing the operation of the Create User Subsection of the Z-stream Centralized Authentication Daemon.

FIG. 17 is a flow chart of the Create User Subsection 580 of the Z-Stream Centralized Authentication Daemon 500 creating a new user. Once it has verified that the system has logged in, it searches the central registry to determine whether the handle the new user desires is available. If the desired handle is determined to be available, Subsection 580 creates a user account by storing the relevant fields in the registry table, retrieving the unique user ID from the database, communicating success to the system, and including the new user's ID for storage in the local authorized user's list, after which it ends the create user thread.

If Subsection 580 determines the desired handle is not available for use, it creates suggested handles based on the original request and scans the database for each suggested handle. Subsection 580 then reports account creation failure to the client, including the reasons therefor (handle exists) and lists suggested alternates, after which it terminates the create user thread.

Figure 18:
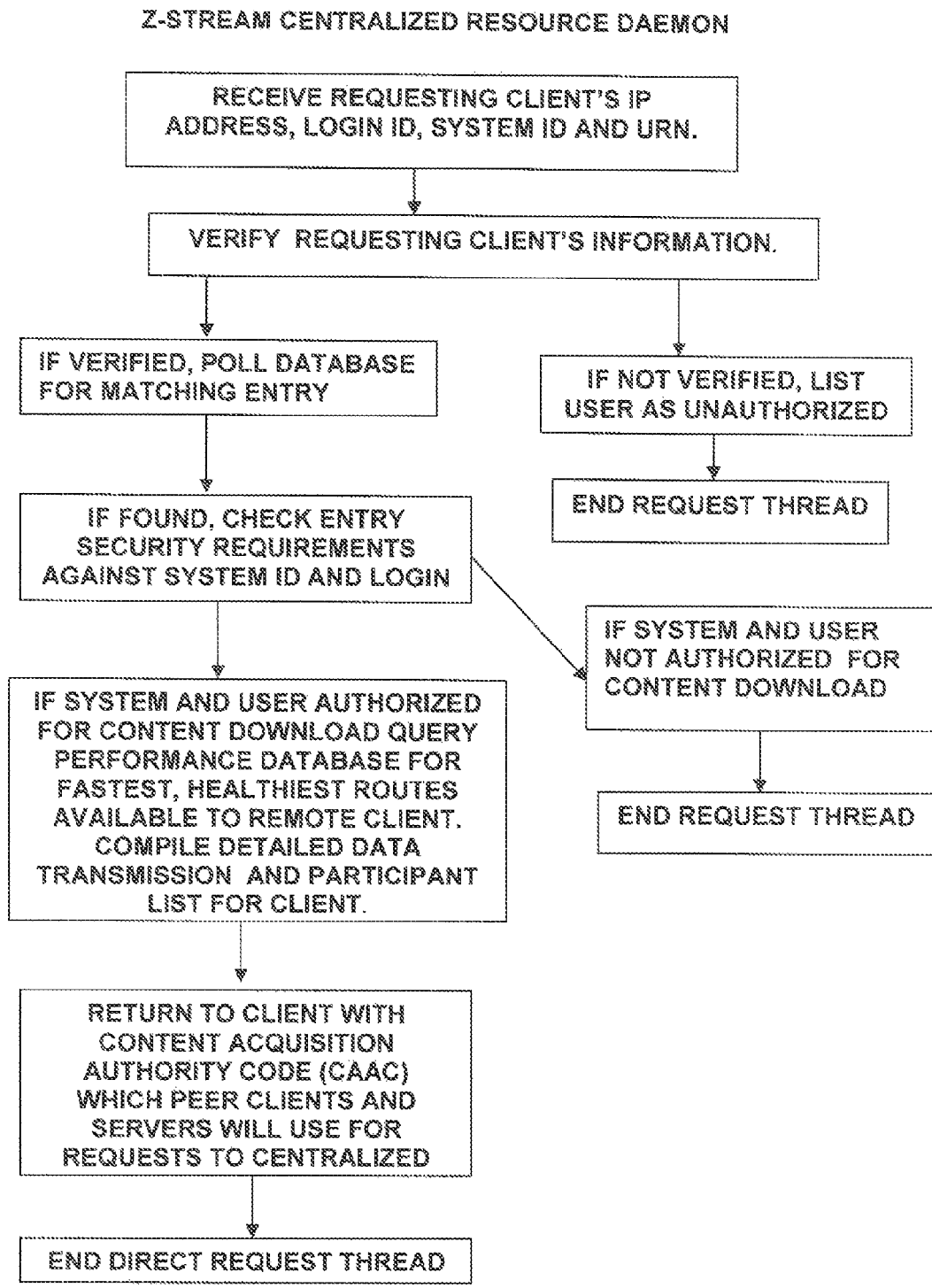
FIG. 18 is a flow chart showing the operation of the Z-stream Centralized Resource Daemon.

FIG. 18 depicts the flow chart showing the operation of the Z-stream Centralized Resource Daemon 600. Upon the receipt of the IP address, Login ID, System ID and URN from the client, the Z-stream Centralized Resource Daemon 600 polls the database of the active session pool for a matching entry. If such entry is found, the Daemon 600 checks the system security requirements against the System ID and the Login ID. If it finds the system and user authorized for content download, it queries the database for the fastest and best routes available to the client and compiles a list of which includes the system ID, IP address, last known uptime, last known available bandwidth, percentage of the file available and a specific fragmentation index. It then forwards that list to the client together with the Content Acquisition Authority Code (CAAC) which peer clients and servers will use for authorization requests to the Centralized Authentication Daemon 500, and ends the Direct Request Thread.

If the system and user are not authorized for content download, Daemon 600 advises the requesting client there are insufficient access rights and terminates the Direct Request Thread. If the Daemon 600 cannot find a matching entry in the database for the system ID and the IP address, it advises the requesting client there is a user unauthorized error and terminates the Direct Request Thread.

Figure 19:
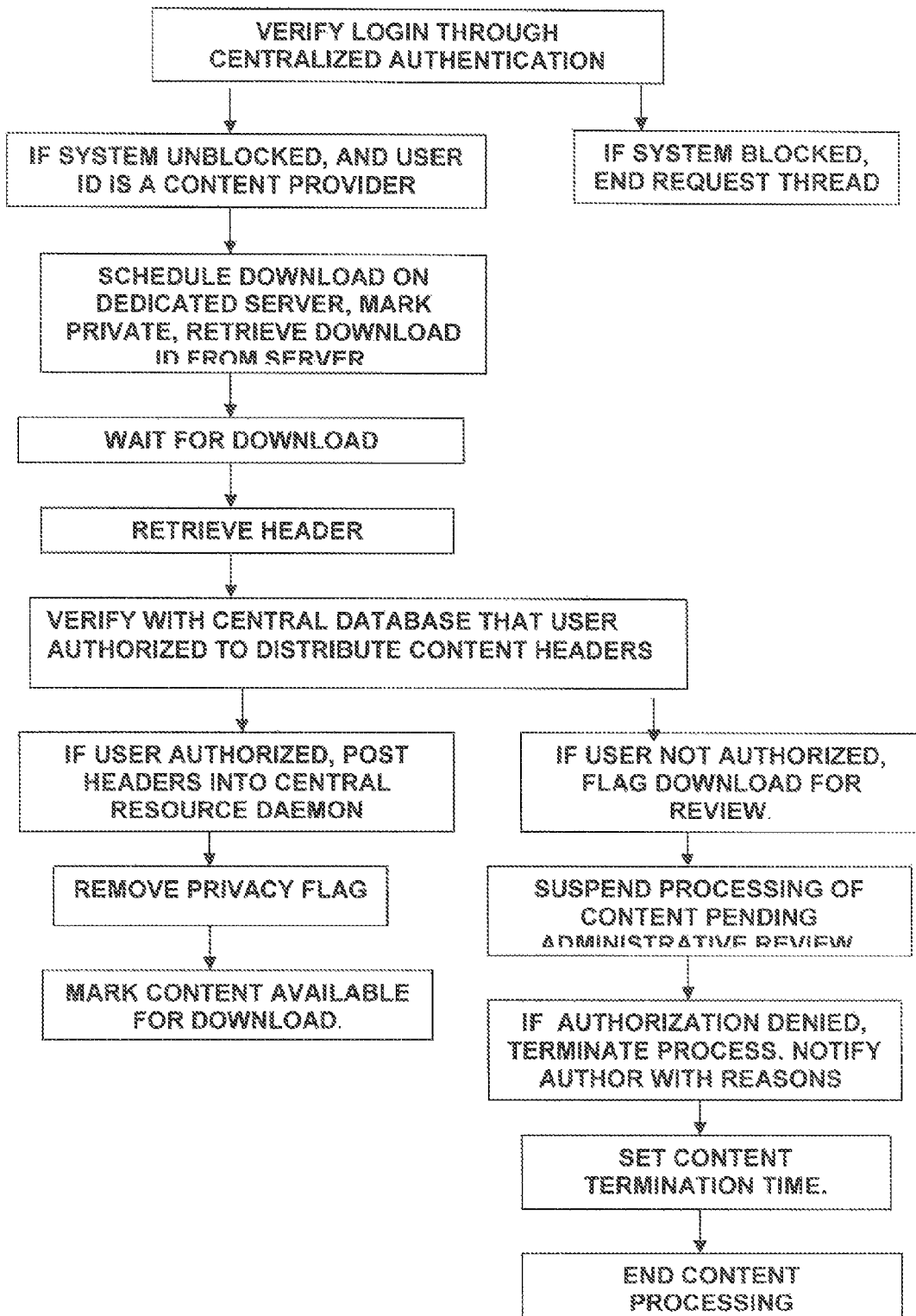
FIG. 19 is a flow chart showing the operation of the Z-stream Content Processing Daemon.

FIG. 19 depicts the flow chart of the operation of the Z-stream Content Processing Daemon 700. After the log in has been verified by the Centralized Authentication Daemon 500, if the system is blocked, it terminates the Request Content Thread. If the system is unblocked and the user ID is registered as a content provider, it schedules the download task for a dedicated server, marks the download as private, and retrieves the download ID from the Central Server 102. When notified the download is complete, it retrieves the Header information from the download and verifies the Headers against the Central Database.

If the user is authorized to distribute content matching headers without review, Content Processing Daemon 700 posts the headers into the Central Resource Daemon, issues a remote privacy flag, and marks content available for download.

If the user is not authorized to distribute content matching headers without review, then it flags the download for administrative review, and suspends the processing of this content until the administrative review is performed. If the administrative review denies authorization, Daemon 700 terminates the process, notifies the author of the process failure, the Pending Content ID, the reasons for the failure, and sets a termination date in accordance with the administrative review. If the termination date is immediate, it queues the server to delete the content and terminates Content Processing.

Figure 20:
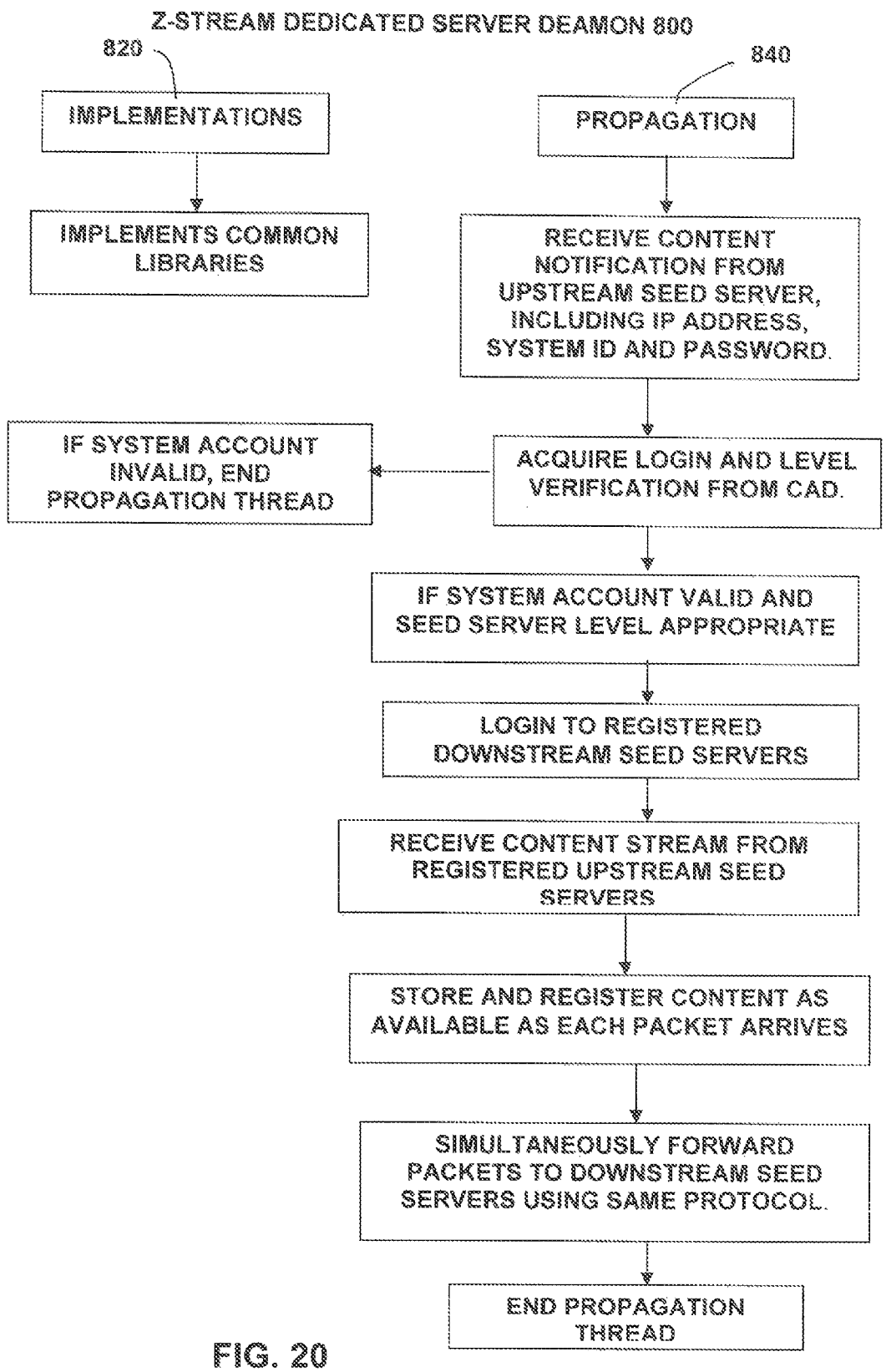
FIG. 20 is a flow chart showing the operation of the Z-stream Dedicated Server Daemon.

FIG. 20 is a flow diagram of the operation of the Z-stream Dedicated Server Daemon 800 which has an Implementation Section 820 which implements the Common Libraries 400 of the codec B and a Propagation Section 840 which distributes content when authorized. Authorization is granted by the Upstream Seed Server which authorization includes IP address, the System ID and the password. Once authority is granted, the Daemon 800 acquires log in and level verification from the Centralized Authentication Daemon 500. If the system account is reported valid and the seed server level is appropriate, the Daemon 800 logs in to downstream seed servers, received content from upstream seed servers, stores and registers the content as available when received from the upstream seed servers, and simultaneously forwards packets to downstream seed servers using the same protocol. When completed, it ends the propagation thread. If the earlier inquiry response from the Centralized Authentication Daemon 500 shows the system account invalid, the Daemon 800 also ends the propagation thread.

Figure 21:
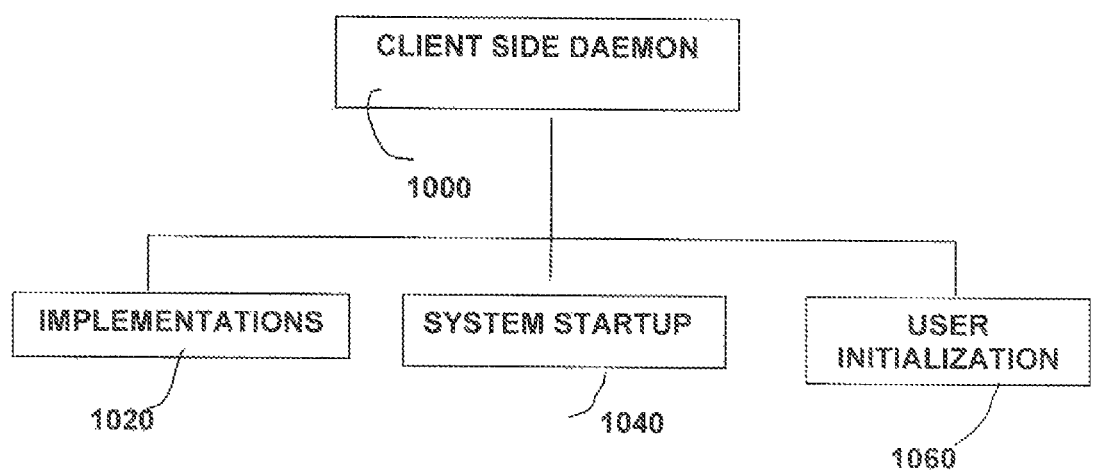
FIG. 21 is a block diagram of the Client Side Implementation Daemon and its three sections.

FIG. 21 is a block diagram of the Client Side Implementation Daemon 1000 and its three sections, the Implementations Section 1020, the System Startup Section 1040, and the User Initialization Section 1060. The Implementations Section 1020 implements the Common Libraries 400 of the codec B.

Figure 22:
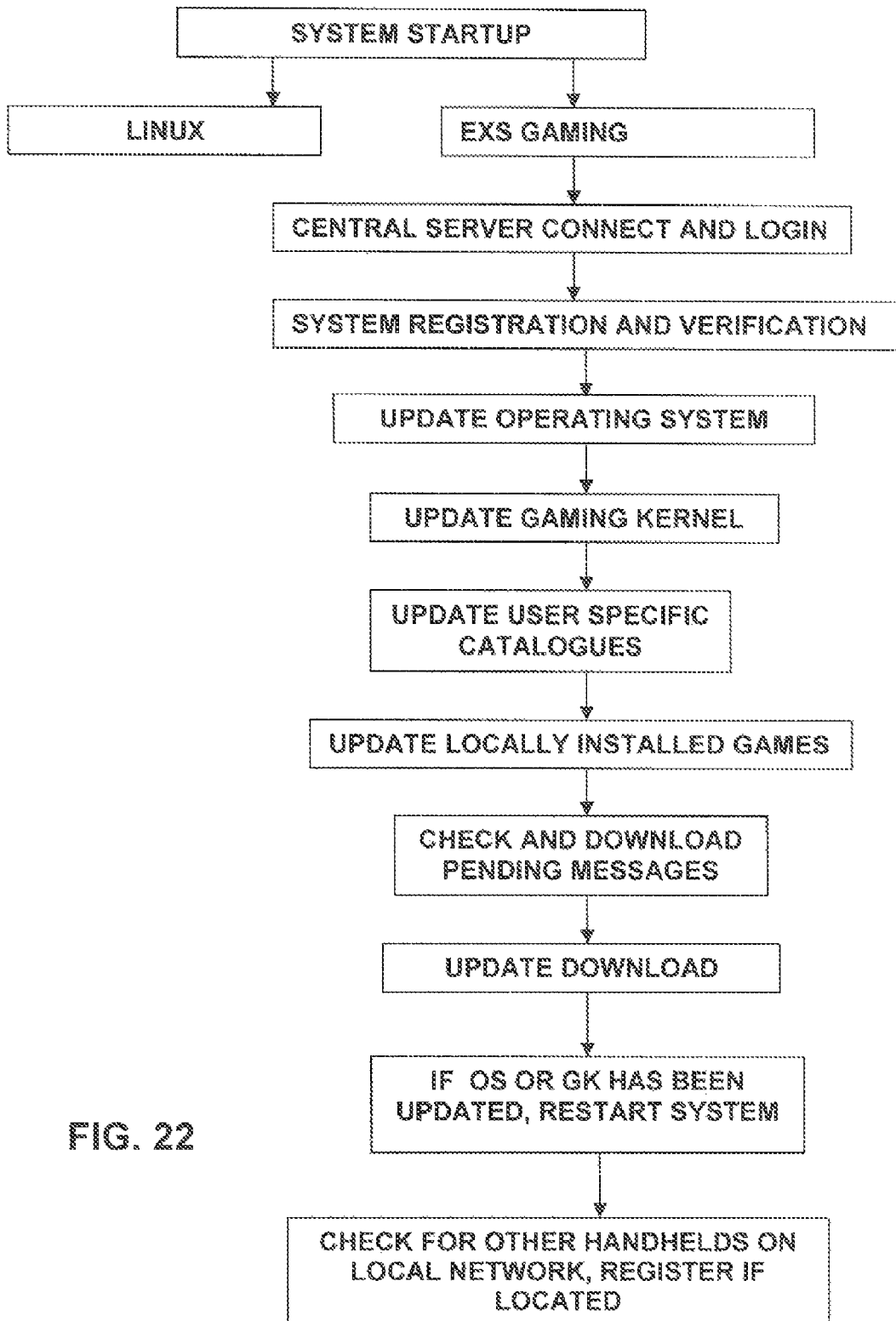
FIG. 22 is a flow chart showing the operation of the Startup Section 1040 of the Client Side Daemon 1000.

FIG. 22 exhibits the flow of the operation of the System Startup Section 1040 of the Client Side Daemon 1000 of the present invention. As the systems start up, the Linux operating system is initialized and the EXS Gaming System is initialized, connected to the Central Server 102 and logged in. After the system registration is verified, the operating system, the gaming kernel, the User Specific Catalogues and the locally installed games are each updated. Pending messages are checked and downloaded as are the updates. If the operating system or the gaming kernel has been updated, the systems are restarted. After all of the above steps have been completed, the Daemon 1040 checks for other handhelds on the local network and registers them if located.

Figure 23:
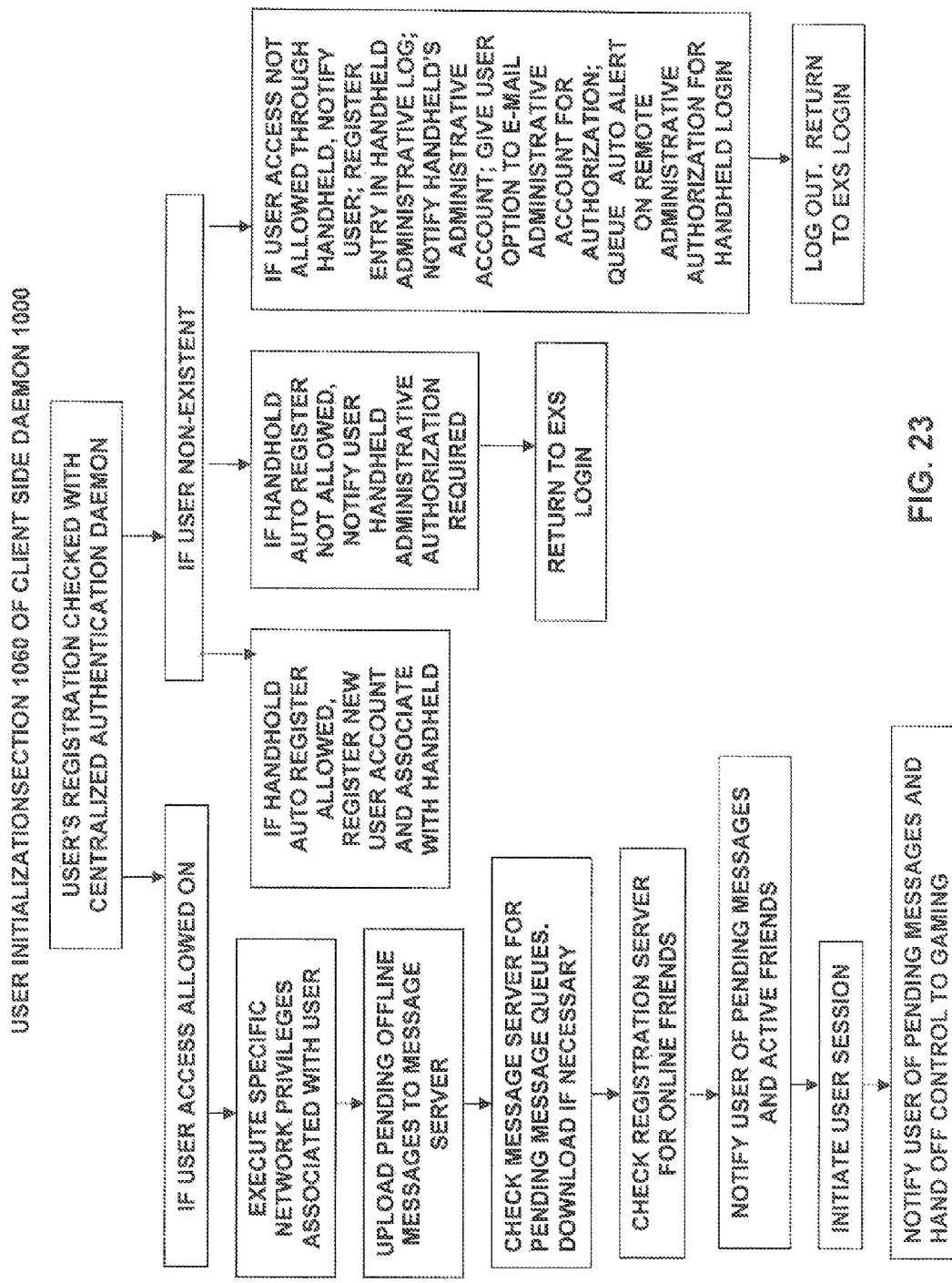
FIG. 23 is a flow chart showing the operation of the User Initialization Section 1060 of the Client Side Daemon 1000.

FIG. 23 depicts the flow chart of the User Initialization Section 1060 of the Client Side Implementation Demon 1000. When the user registers, the registration is verified with the Centralized Authentication Daemon 500. If the user exists and allowed access to the network, the Daemon 1060 executes the specific network privileges associated with the user, uploads the pending messages to the message server, checks the message server for message queues, downloads if necessary, checks the registration server for online friends, and notifies the user of pending messages and active friends. The daemon 1060 then in initiates the user section and presents the user menu and hands off control to the gaming interface.

If the user is non-existent, and handheld auto registration is allowed, the daemon 1060 registers a new user account and associates the account with the hand held. If handheld registration is not allowed, it notifies the user administrative authorization is required and returns to EXS login.

If user access is not allowed through a handheld, it notifies the user, registers the entry in the handheld administrative log, and sends a message to the handheld's administrator's central account. It also gives the user the option to e-mail the administrator's account for authorization and queues an auto alert for remote administrative authorization for handheld login. It then logs out and returns to EXS login.

It should be apparent that changes and substitutions in the unique and novel arrangement, combination, assembly and interaction of the various parts and components shown and described herein may be made without departing from the nature and principle of my invention.

Having thus described my invention, what I claim and desire to secure by Letters Patent is shown in the drawings, described in the specification and claimed in the following claims:

1. A computer implemented codec data system for use in a host computer for controlling proprietary content downloading to authorized destinations, said computer implemented codec data system comprising:

identification means for distinguishing between a data carrier and data destination and for limiting the reception and access to actionable content to only destinations with appropriate license, said identification means also including means for allowing unlicensed carriers to transceive content without interference;

encoding means for encapsulating licensed content in a heterogeneous file that stores distributed content in an independent file system readable only by a special daemon process;

authorization means for controlling content access and distribution through an authorization server programmed to insure that licensed content is only distributed to appropriately licensed end users and also for enabling control accounts to dictate what their subordinate accounts may access or distribute over the network;

means for leveraging local cluster multi-casting to allow all authorized clients within a specific cluster to receive data using a local node in such manner that many clients may obtain content from the same dataset at substantially the same time without congesting remote internet pathways;

a best source seeking algorithm to insure that the closest available hosts with the best available bandwidth are always selected as content suppliers before random hosts of varying distance or speed;

monitoring means for tracking performance from local client to remote peers in real time and logging the performance data to the host computer so that other clients may utilize the optimized routes and avoid downed, damaged or tainted pathways; and means for allowing the end user to copy content to a separable format zero or more times, with optimal serialization in accordance with acquired license.

2. The computer implemented codec data system of claim 1 which also includes means for enabling content publishers preemptively to propagate or restrict content throughout the network.

3. The computer implemented codec data system of claim 1 which also includes means for enabling content publishers automatically to track usage of their licensed content over managed and unmanaged transmissions.

4. The computer implemented codec data system of claim 1 which also includes means for delegating license authority through the host server to individual content provider's licensing systems and directly updating their databases.

5. The computer implemented codec data system of claim 1 which also includes means for enabling end users to set up a preferential profile for automatic download of content that matches their viewing patterns or desires.

6. The computer implemented codec data system of claim 1 which also includes means for maintaining permanent distribution servers wherein file lifetime is not specifically designated by optional user retention.

7. A computer implemented codec data system for use in a host computer for controlling content downloading to authorized destinations, said computer implemented codec data system comprising:

identification means for distinguishing between a data carrier and data destination and for limiting the reception of and access to actionable content to only destinations with appropriate license, said identification means also including means for allowing unlicensed carriers to transceive content without interference;

encoding means for encapsulating content in a heterogeneous file that stores content in an independent file system readable only by a predetermined decoding daemon process;

means for enforcing content access and distribution through a centralized authorization server to insure that content is only distributed to properly identified end users and also for enabling control accounts to dictate what their subordinate accounts may access or distribute over the network;

means for leveraging local cluster multi-casting to allow all authorized clients within a specific cluster to receive data using a local node so that many may connect to the same dataset without congesting remote internet pathways;

a best source seeking algorithm to insure that the closest available hosts with the best available bandwidth, including circuit wide conservation, are always selected before random hosts of varying distance or speed; and means for tracking performance from local client to remote peers in real time and logging the performance data to the host computer so that other clients may utilize the optimized routes and avoid downed, damaged or tainted pathways.

8. The computer implemented codec data system of claim 7 which also includes means for enabling content publishers preemptively to propagate or restrict content throughout the network.

9. The computer implemented codec data system of claim 7 which also includes means for enabling content publishers automatically to track usage of their licensed content over managed and unmanaged transmissions.

10. The computer implemented codec data system of claim 7 which also includes means for directly updating the databases of the content providers through the host server.

11. The computer implemented codec data system of claim 7 which also includes means for enabling end users to set up a preferential profile for automatic download of content that matches their viewing patterns or desires.

12. The computer implemented codec data system of claim 7 which also includes means for maintaining permanent distribution servers wherein file lifetime is not specifically designated by optional user retention.

13. A computer implemented codec data system for use in a host for controlling content downloading to authorized destinations, said computer implemented codec data system comprising:
   means for defining a cluster of clients wherein clients within that cluster who require the same content substantially simultaneously are identified as cluster members;
   means for leveraging local cluster multi-casting to allow all clients within said cluster to receive data content using a local node so that many may connect to the same sources of content supply without congesting remote internet pathways;
   a best source seeking algorithm to insure that the available clients within that cluster with the best available bandwidth are always selected as first tier receptors of said content within that cluster and simultaneously selected as suppliers of content to other clients within said cluster having lower bandwidths; and
   means for supplying at substantially the same time the content needs of each client within the cluster as a steady and continuous stream of data, which supply means includes the transceiving capabilities of the other clients within the cluster according to their relative available bandwidths.

14. The computer implemented codec data system of claim 13 in which said source seeking algorithm also includes means for assigning the other clients in said cluster to tier positions according to their available bandwidths whereby a continuous stream of data content flows from clients in the cluster having higher bandwidths to clients in the cluster having lower bandwidths, and supply control means for supplying the needs of the first tier clients within the cluster and for simultaneously utilizing the lower tier clients within the cluster as the supplier of the needs of the upper tier clients within the cluster.

15. The computer implemented codec data system of claim 14 which also includes authentication means for identifying each client that desires content, for verifying that each of said clients are authorized to receive such content, and for prohibiting the distribution of content to unauthorized clients.

16. The computer implemented codec data system of claim 15 which also includes means for insuring that said clients within said cluster only retransmit content which has been confirmed to have been accurately received.

\* \* \* \* \*